United States Patent [19]
Liu et al.

[11] Patent Number: 4,964,131
[45] Date of Patent: Oct. 16, 1990

[54] BROADBAND OPTICAL FIBER LASER

[75] Inventors: Karen Liu, Montclair, N.J.; Byoung Y. Kim, Menlo Park, Calif.; Michel J. F. Digonnet, Palo Alto, Calif.; Kenneth A. Fesler, Sunnyvale, Calif.; Herbert J. Shaw, Stanford, Calif.

[73] Assignee: The Board of Trustees of the Leland Stanford Junior University, Stanford, Calif.

[21] Appl. No.: 319,241

[22] Filed: Mar. 9, 1989

Related U.S. Application Data

[63] Continuation-in-part of Ser. No. 287,573, Dec. 16, 1988, abandoned, which is a continuation of Ser. No. 176,739, Apr. 1, 1988, abandoned.

[51] Int. Cl.$^5$ ............................................. H01S 3/30
[52] U.S. Cl. .................................... 372/6; 350/96.15; 372/69
[58] Field of Search ..................... 372/6, 69; 350/96.15

[56] References Cited

U.S. PATENT DOCUMENTS

| | | | |
|---|---|---|---|
| 4,386,822 | 6/1983 | Bergh . | |
| 4,410,275 | 10/1983 | Shaw et al. . | |
| 4,456,377 | 6/1984 | Shaw et al. . | |
| 4,493,528 | 1/1985 | Shaw et al. . | |
| 4,529,312 | 7/1985 | Pavlath et al. . | |
| 4,536,058 | 8/1985 | Shaw et al. . | |
| 4,556,279 | 12/1985 | Shaw et al. . | |
| 4,564,262 | 1/1986 | Shaw . | |
| 4,601,541 | 7/1986 | Shaw et al. . | |
| 4,615,582 | 10/1986 | Lefevre et al. . | |
| 4,634,282 | 1/1987 | Shaw et al. . | |
| 4,637,025 | 1/1987 | Snitzer et al. | 372/6 |
| 4,637,722 | 1/1987 | Kim . | |
| 4,671,658 | 6/1987 | Shaw et al. . | |
| 4,687,330 | 8/1987 | Lefevre . | |
| 4,756,003 | 7/1988 | Baer et al. | 372/75 |
| 4,773,759 | 9/1988 | Bergh et al. . | |
| 4,779,975 | 10/1988 | Kim . | |
| 4,780,876 | 10/1988 | Smith et al. | 372/6 |
| 4,794,598 | 12/1989 | Desurvire et al. | 372/6 |
| 4,872,177 | 10/1989 | Baer et al. | 372/21 |

OTHER PUBLICATIONS

Iain D. Miller, et al. "A Nd$^{3+}$-Doped cw Fiber Laser
(List continued on next page.)

Primary Examiner—Léon Scott, Jr.
Attorney, Agent, or Firm—Knobbe, Martens, Olson & Bear

[57] ABSTRACT

An optical fiber laser includes a single-mode optical fiber doped with a lasing material such as Neodymium. The optical fiber is pumped with a pump optical signal having a pump wavelength selected to cause spontaneous emission of an optical signal at a second wavelength different from the pump wavelength. The optical fiber is formed into a laser cavity such as by including a suitable reflector at each of the two ends of a suitable length of the optical fiber so that the emitted optical signal oscillates therein. One of the reflectors has a reflectivity at the wavelength of the emitted light so that most (e.g., approximately 95%) of the emitted light is reflected back into the laser cavity and a smaller portion (e.g, approximately 5%) is transmitted through the mirror as a laser output signal. Alternatively, the optical fiber can be formed into a ring laser structure using an optical coupler that couples a substantial portion (e.g., approximately 95%) of the emitted light back into the ring for recirculation therein and provides a smaller portion of the emitted light (e.g., approximately 5%) as a laser output signal. The wavelength of the pump optical signal is selected to be outside the pump variable tuning range of the Neodymium-doped optical fiber (i.e., the range of pump wavelengths which stimulate emitted wavelengths having a average wavelengths with a generally one-to-one correspondence to the pump wavelength). Pumping with a pump signal outside the pump variable tuning ranges causes the emitted light to have a broad spectral envelope of longitudinal modes having emission wavelengths corresponding to substantially all the pump variable tuning range. Thus, by pumping the optical fiber with a single pump wavelength, a broadband laser output signal is generated.

48 Claims, 10 Drawing Sheets

OTHER PUBLICATIONS

Using All-Fiber Reflectors," Applied Optics, vol. 26, No. 11, Jun. 1, 1976, pp. 2197-2201.

C. Brecher, et al., "Line-Narrowed Fluorescence Spectra and Site-Dependent Transition Probabilities of $Nd^{3+}$ in Oxide and Fluoride Glasses," Physical Review B, vol. 18, No. 10, Nov. 15, 1978, pp. 5799-5811.

R. E. Epworth, "The Temporal Coherence of Various Semiconductor Light Sources Used in Optical Fibre Sensors," *Fiber-Optic Rotation Sensors and Related Technologies*, S. Ezekial, et al., Editors, Springer-Verlag, 1982 (ISBN 3-540-1179-1 and 0-387-11791-1), pp. 237-244.

R. J. Mears, et al., "Neodymium-Doped Silica Single-Mode Fiber Lasers," Electronics Letters, vol. 21, No. 17, Aug. 1985, pp. 738-740.

Laurence Reekie, et al., "Tunable Single-Mode Fiber Lasers," *Journal of Lightwave Technology*, vol. LT-4, No. 7, Jul. 1986, pp. 956-959.

David N. Payne, "Special Fibers and Their Uses," *OFC/IOOC'87*, Reno, Nevada, Jan. 21, 1987.

C. A. Miller, et al., "Low-Threshold CW Operation of an Erbium-Doped Fiber Laser Pumped at 807 nm Wavelength," Electronics Letter, vol. 23, No. 16, Jul. 30, 1987, pp. 865-867.

L. Reekie et al., "Diode-Laser-Pumped Operation of an $Er^{3+}$-Doped Single-Mode Fiber Laser," Electronics Letters, vol. 23, No. 20, Sep. 24, 1987, pp. 1076-1078.

K. Böhm, et al., "Low-Drift Fiber Gyro Using a Superluminescent Diode," Electronics Letters, vol. 17, No. 10, May 14, 1981, pp. 352-353.

Masataka Nakazawa, et al., "Continuous-Wave Laser Oscillation with an Ultralong Optical-Fiber Resonator," *Journal of the Optical Society of America*, vol. 72, No. 10, Oct. 1982, pp. 1338-1344.

Masataka Nakazawa, et al., "Lasing Characteristics of a $Nd^{3+}$:YAG Laser with a Long Optical-Fiber Resonator," Journal of the Optical Society of America, vol. 75, No. 6, Jun. 1983, pp. 838-842.

R. F. Schuma, et al., "Superluminescent Diode (SLD) Wavelength Control in High Performance Fiber Optic Gyroscopes," SPIE, vol. 719, 1986, pp. 192-196.

C. S. Wang, et al., "High Power Long Life Superluminescent Diode," SPIE, vol. 719, 1986, pp. 203-207.

M. Zürn, et al., "Line Narrowing and Spectral Hole Burning in Single-Mode $Nd^{3+}$-Fiber Lasers," Optics Letters, vol. 12, No. 5, May 1987, pp. 316-318.

Karen Liu, et al., "10mW Superfluorescent Single-Mode Fibre Source at 1060nm," Electronics Letters, vol. 23, No. 24, Nov. 19, 1987, pp. 1320-1321.

Karen Liu, et al., "Broadband Diode-Pumped Fibre Laser," *Electronics Letters*, vol. 24, No. 14, 7th Jul. 1988, pp. 838-840.

LASER OUTPUT BANDWIDTH
VS.
PUMP WAVELENGTH

LASER OUTPUT AVERAGE WAVELENGTH
VS.
PUMP WAVELENGTH

LASER OUTPUT SPECTRAL ENVELOPE

VISIBILITY VS. PATH DIFFERENCE

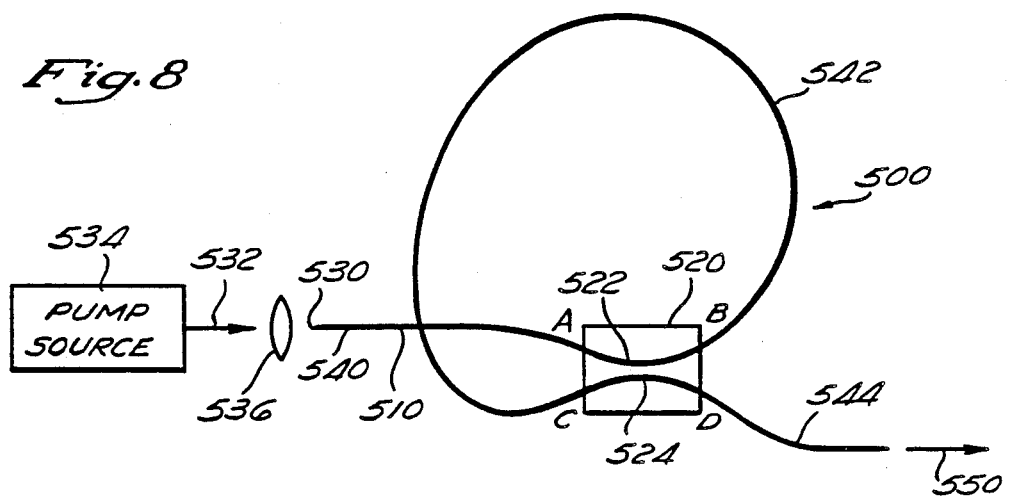
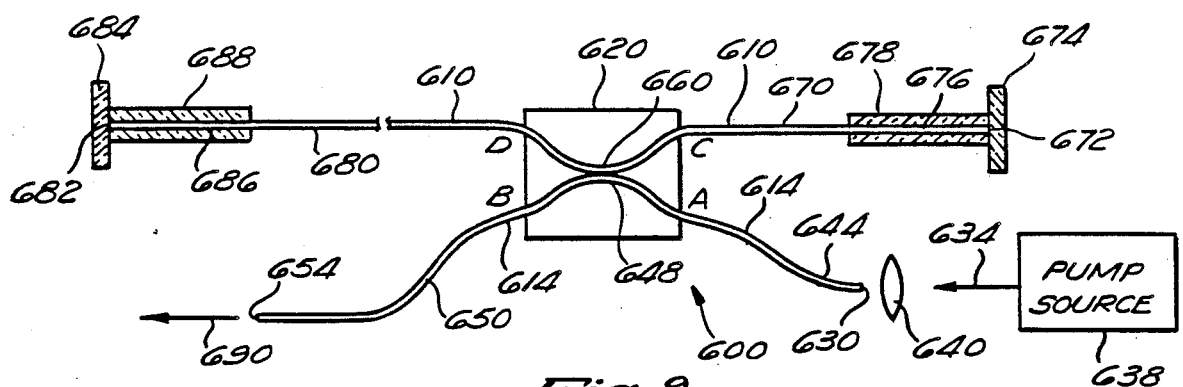
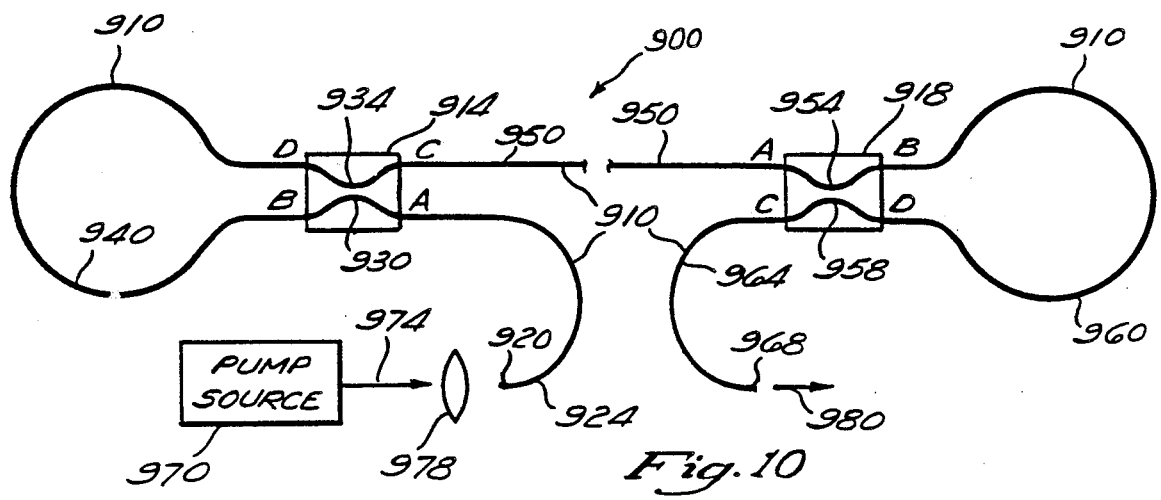

BROADBAND OPTICAL FIBER LASER

Related Applications

This application is a continuation-in-part of U.S. patent application Ser. No. 287,573, filed on Dec. 16, 1988, now abandoned which is a continuation of U.S. patent application Ser. No. 176,739, filed on Apr. 1, 1988, now abandoned.

Background of the Invention

1. Field of the Invention

The present invention is in the field of lasers, and, more particularly, is in the field of lasers in which the lasing medium is an optical fiber which is pumped with a pump optical signal and which generates an output optical signal having a different wavelength than the wavelength of the pump optical signal.

2. Description of the Related Art

Optical fibers are being used for an increasing number of applications. One such application is an optical fiber rotation sensor comprising a loop of optical fiber into which two light signals are introduced and caused to counterpropagate around the optical loop. Such rotation sensors are described, for example, in U.S. Pat. No. 4,410,275; U.S. Pat. No. 4,456,377; U.S. Pat. No. 4,487,330; U.S. Pat. No. 4,634,282; and U.S. Pat. No. 4,637,722. For such rotation sensors and for other optical fiber applications, it is desirable to have a stable well-controlled light source.

Prior art lasers typically concentrate the optical energy output from a laser in a very narrow band of optical wavelengths and have a relatively long temporal coherence length. In addition, some lasers are tunable over a range of wavelengths. For example, L. Reekie, et al., "DIODE-LASER-PUMPED OPERATION OF AN $Er^{3+}$-DOPED SINGLE-MODE FIBRE LASER," *ELECTRONICS LETTERS*, 24th September 1987, Vol. 23, No. 20, pp. 1076–1077, which reports on extending the tuning range of an erbium doped fiber by varying the fiber length. In C. A. Millar, et al., "LOW-THRESHOLD CW OPERATION OF AN ERBIUM-DOPED FIBRE LASER PUMPED AT 807 nm WAVELENGTH," *ELECTRONICS LETTER*, 30th July 1987, Vol. 23, No. 16, pp. 865–866, a low-threshold erbium-doped optical fiber laser is described that has a linewidth of about 1 nm FWHM (full width at half magnitude). In Laurence Reekie, et al., "Tunable Single-Mode Fiber Lasers," *JOURNAL OF LIGHTWAVE TECHNOLOGY*, Vol. LT-4, No. 7, July 1985, pp. 956–959, the tuning characteristics of a $Nd^{3+}$-doped single-mode fiber laser and the tuning characteristics of an $Er^{3+}$-doped single-mode fiber laser are described. In R. J. Mears, et al., "NEODYMIUM-DOPED SILICA SINGLE-MODE FIBRE LASERS," *ELECTRONICS LETTERS*, Vol. 21, No. 17, 15th August 1985, pp. 739–740, a dye-laser-pumped fiber ring-cavity laser having a FWHM line width of 2 nm at a wavelength of 1078 nm is described. In David N. Payne, "Special fibers and their uses," OFC/IOOC '87, Reno, Nevada, 21 January 1987, Invited Paper WI1, the use of rare-earth and transition-metal-doped single-mode fibers in very long (300 meter) lasers that are tunable over a range of 80 nm is discussed.

For some applications, such as certain optical fiber rotation sensors, a broadband optical energy source having a short temporal coherence length is desirable. It has been demonstrated that using a broadband optical energy source in an optical fiber rotation sensor, for example, reduces phase errors caused by the Kerr effect. A broadband optical signal can also be advantageously used to reduce phase errors in the combined optical signal from the loop 178 caused by coherent backscattering (i.e., Rayleigh backscattering) and by polarization cross-coupling in the loop. See, for example, U.S. Pat. No. 4,773,759; U.S. patent application Ser. No. 488,732, filed on Apr. 26, 1983, corresponding to Canadian Patent No. 1,227,660; and U.S. patent application Ser. No. 909,741, filed on Sept. 19, 1986, corresponding to Canadian Application No. 547,242, filed on Sept. 18, 1987; all of which are assigned to the assignee of the present application. Such broadband optical sources include, for example, superluminescent light emitting diodes, and the like. An exemplary superluminescent diode has a relatively broad optical line width (e.g., approximately 15 nanometers) at the optical wavelengths in the range of 800 to 850 nanometers, for example. However, for a given power input, exemplary superluminescent diodes do not provide an adequate amount of optical energy when compared to a laser, for example. On the other hand, resonant cavity lasers typically provide adequate amounts of power but have a relatively narrow line width (e.g., less than 5 nanometers). It is desirable to obtain the relatively high power output of a laser while obtaining the relatively wide line widths heretofore unobtainable with a resonant cavity laser. Furthermore, it is known that the temperature stability of the emission wavelength of a typical superluminescent diode is not satisfactory for many applications. It is also desirable that the emission wavelength be stable over a wide temperature range.

More recently, U.S. Pat. No. 4,637,025 to Snitzer, et al., describes a super radiant light source that includes a an optical fiber having a core doped with a selected active laser material such as Neodymium. The optical fiber in the Snitzer, et al., patent is pumped with optical energy from a laser signal source having a wavelength within one of the absorption bands of the selected active laser material. The pump optical energy is absorbed by the active laser material and photons are emitted at characteristic emission bands of the active laser material. The emitted light is a low coherence light having wavelengths distributed about a principal wavelength determined by the emission characteristics of the active laser material and any wavelength dependent characteristics of the fiber.

The device described in the Snitzer, et al., relies upon the principal of superfluorescence to generate the light output. The output end of the optical fiber is specifically constructed to be non-reflective so that the spontaneously-emitted light travelling forward in the fiber is emitted from the output end of the fiber. The input end of the fiber may include a dichroic reflector so that any light travelling towards the input end of the fiber is reflected back to the output end of the fiber to increase the light output. The Snitzer, et al., patent specifically states that "conditions conducive to laser oscillations are not present so that conditions conducive to light generation by amplified spontaneous emission are preserved." Thus, the teachings of the Snitzer, et al., patent are consistent with the conventional wisdom that laser oscillations within the fiber will result in undesirable line-narrowing in the output signal.

One skilled in the art will recognize the use of superfluorescence in an optical fiber light source will not provide an optical signal output intensity as high as can be obtained by a resonant cavity laser in which the oscillating light induces further emissions of light at the output wavelength. However, it has been previously understood that the use of a resonant cavity laser will produce an optical output signal having an undesirably narrow linewidth for those applications requiring a broadband light source, thereby making resonant cavity lasers disadvantageous for use as broadband light sources.

Summary of the Invention

The present invention comprises a broadband light source which preferably uses an optical fiber structure to provide a resonant laser cavity. Unlike previously known resonant lasers, the resonant laser of the present invention provides an optical output signal having a sufficiently wide line width so that the laser can be used in combination with optical fiber rotation sensors and other systems requiring a broadband light source. The present invention is particularly advantageous in that the optical output intensity is relatively great compared to other broadband sources having similar intensities for the applied input signal. In addition, the temperature stability of the emission wavelength is greatly improved.

The present invention comprises a resonant laser having a lasing medium preferably comprised of single mode optical fiber. A resonant cavity emits light in an emission spectrum in response to application of pump energy to the lasing medium. The emission spectrum has a first bandwidth at a first wavelength of the pump energy and a second bandwidth at a second wavelength of the pump energy, the second bandwidth being significantly greater than the first bandwidth. The resonant cavity is sized to support at least thousands of longitudinal modes, at least some of which correspond to wavelengths outside the first bandwidth, but within the second bandwidth. The laser includes a source of pump energy, for example, a laser diode, for pumping the lasing medium at the second wavelength. In the preferred embodiment, the pump energy wavelength does not coincide with peak absorption wavelengths of the absorption band of the lasing medium.

The resonant laser of the present invention may be implemented in a variety of configurations. In one such configuration, a resonant cavity is formed by an optical fiber having first and second ends and having respective first and second mirrors positioned proximate to the first and second ends to reflect light therebetween. At least one of the mirrors is partially transmissive to emitted light having a wavelength within the second bandwidth so that a portion of the emitted light passes through the mirror. In another configuration, the resonant cavity is formed by a loop of lasing optical fiber. A multiplexing coupler couples light to and from the loop. The pump energy propagates only once around the loop, and the emitted light circulates around the loop, with a small fraction output on each circulation. In a further embodiment, the resonant cavity comprises a lasing optical fiber, and a second optical fiber coupled to the source of optical energy. A multiplexing coupler couples the second fiber to the lasing fiber at a location between the first and second ends, and couples pump energy from the second fiber to the lasing optical fiber while coupling emitted light from the lasing optical fiber to the second optical fiber. First and second mirrors are positioned proximate to the first and second ends, respectively, of the lasing optical fiber, such that substantially all of the light incident on the mirrors at the emitted wavelength is reflected. In yet another embodiment, the resonant cavity comprises a lasing optical fiber forming first and second loops, with an intermediate portion therebetween. Wavelength selective multiplexing couplers are used to couple pump energy to the lasing fiber such that the pump light traverses the lasing fiber without multiple passes therethrough. The wavelength selective characteristics of the multiplexing couplers are such that the emitted light passes a plurality of times through the intermediate portion of the lasing fiber.

In accordance with a further embodiment of the invention, the resonant laser is comprised of an optical fiber formed of laser material having a wavelength absorption band. The laser material emits light in response to optical pumping with pump light. The wavelength of the emitted light varies with the wavelength of the pump light through the absorption band in accordance with the characteristic curve having at least one minima or maxima. A source of pump light produces light at a wavelength corresponding to one of the minima or maxima. The wavelength of the pump light is preferably further selected to produce broadband emission.

A method of supplying broadband light to an interferometer comprises the steps of pumping a laser medium at a pump wavelength to cause the lasing medium to emit light. The pump wavelength is selected to provide an inhomogeneously broadened emission having a selected bandwidth. A portion of the emission is repeatedly passed through the lasing medium to stimulate emission of light at discrete wavelengths which form a spectral envelope. This spectral envelope is filled with a sufficient number of discrete wavelengths to provide an effectively continuous spectrum within the spectral envelope, and the emission is coupled to said interferometer.

The laser of the present invention is particularly advantageous for use in a fiber optic sensor. The sensor comprises a loop comprised of optical fiber having two polarization modes, each of which propagates light at a different velocity, thereby providing an effective optical path length difference for the two modes for light traversing the loop. A laser comprising a lasing medium formed of an optical fiber includes a resonant cavity, coupled to supply light to the loop. The optical path length difference is less than the product of the length of the resonant cavity of the laser and the refractive index of the optical path traveled by the light through the resonant cavity. The laser is sized to support at least thousands of longitudinal modes. Preferably, the laser emission has a bandwidth which is relatively narrow in a first range of average wavelengths and relatively broad in a second range of wavelengths, and the pump wavelength is selected to cause the lasing medium to emit light at an average wavelength within the second range of average wavelengths. The lasing medium preferably has an average wavelength within the second range of wavelengths that is substantially insensitive to variations in pump wavelengths.

In one embodiment of the present invention, the resonant cavity laser includes a phase modulator within the cavity to modulate the phase and the frequency of the light within the cavity. The phase modulation within the resonant cavity operates to substantially reduce errors in the sensed rotation signal caused by modulated optical feedback from the rotation sensor to the resonant cavity laser. A Faraday isolator may also be advantageously inserted in the optical path between the resonant cavity laser and the rotation sensor to attenuate the modulated optical energy fed back from the rotation sensor to the resonant cavity laser.

Brief Description of the Drawings

FIG. 8 is a schematic representation of an alternative embodiment of the present invention which utilizes a multiplexing coupler to form a resonant cavity comprising an optical fiber loop.

FIG. 9 is a schematic representation of an alternative embodiment of the present invention which utilizes a multiplexing coupler in combination with a pair of end mirrors.

FIG. 10 is a schematic representation of an alternative embodiment of the present invention which utilizes a pair of multiplexing couplers to form a resonant cavity in a single optical fiber.

Detailed Description of the Invention

Figure 1:
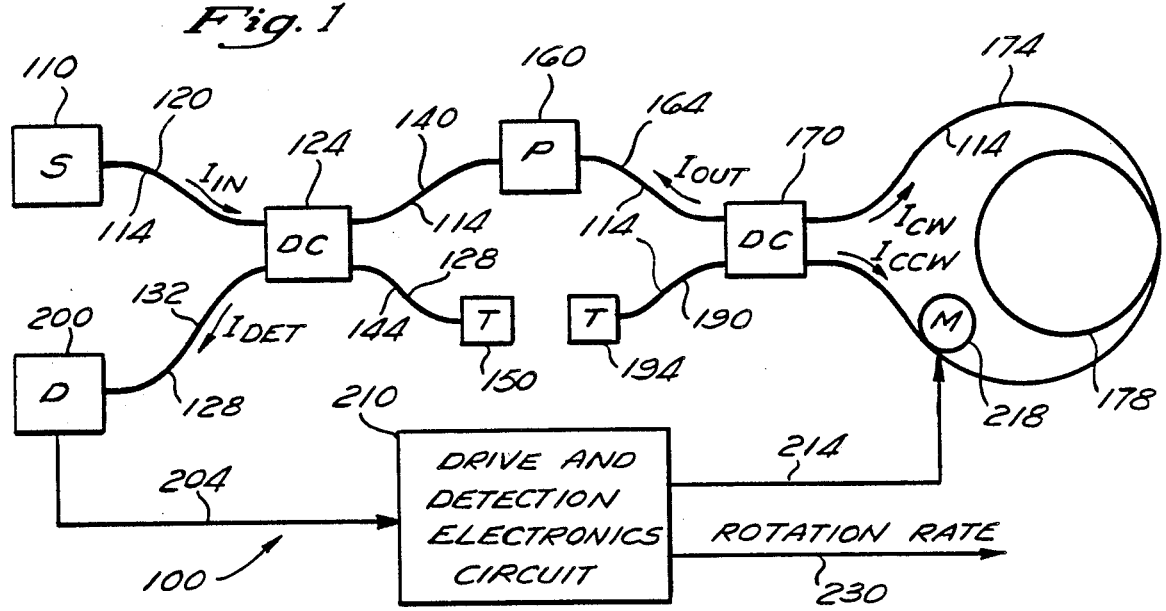
FIG. 1 is a schematic representation of an optical fiber rotation sensor such as may be used in combination with the resonant laser light source of the present invention.

The present invention comprises an optical fiber resonant laser that is particularly useful as a broadband optical source for an optical fiber rotation sensor, for example. An exemplary rotation sensor 100 that can be advantageously used in combination with laser of the present invention is illustrated in FIG. 1. The rotation sensor 100 comprises a Sagnac interferometer which includes a light source (S) 110 which provides an optical input signal $I_{IN}$, represented by an arrow. The input signal $I_{IN}$ is coupled to a first optical fiber 114 which is preferably a single-mode birefringent optical fiber. The first optical fiber 114 includes a first optical fiber segment 120 that serves as the input to the rotation sensor 100. The first optical fiber segment 120 provides a propagation path to a first optical directional coupler (DC) 124, which, in preferred embodiments of the rotation sensor 100, is constructed by juxtaposing two fibers. Details of such a coupler are disclosed in U.S. Pat. Nos. 4,493,528; 4,536,058; 4,564,262; and 4,601,541. Those skilled in the art will appreciate that integrated optical couplers may also be utilized.

As set forth in the referenced patents, the first optical fiber segment 120 is connected to one port of the first directional coupler 124. The first directional coupler 124 is formed by juxtaposing a second optical fiber 128 with first optical fiber 114. The second optical fiber 128 is also advantageously a birefringent single-mode optical fiber. The second optical fiber 128 includes a second optical fiber segment 132 connected to an adjacent port of the first directional coupler 124.

The first directional coupler 124 has two additional ports, one of which is connected to a third optical fiber segment 140 and the other of which is connected to a fourth optical fiber segment 144.

In preferred embodiments of the rotation sensor 100, the first directional coupler 124 is constructed so that approximately 50% of the optical energy propagating in the first optical fiber segment 120 from the light source 110 towards the first directional coupler 124 is directly transmitted to the third optical fiber segment 140 and approximately 50% of the optical energy is coupled to the fourth optical fiber segment 144. It should be understood that the first directional coupler 124 is bidirectional in that optical energy propagating in the third optical fiber segment 140 towards the first directional coupler 124 is divided substantially equally between the first optical fiber segment 120 and the second optical fiber segment 128.

The fourth optical fiber segment 144 is terminated by a first light-absorbing terminator (T) 150. The first light-absorbing terminator 150 absorbs substantially all the optical energy incident on it from the fourth optical fiber segment 144 so that substantially no light is reflected back towards the first directional coupler 124.

The third optical fiber segment 140 provides a propagation path from the first directional coupler 124 to a polarizer (P) 160. Those skilled in the art will recognize that the polarizer is advantageous in that it reduces certain types of phase errors. If no polarizer is used, reduction of phase errors may be achieved through use of unpolarized light, as described in U.S. Pat. No. 4,529,312 and U.S. Pat. No. 4,634,282. The polarizer can be constructed in accordance with a number of different embodiments, and is advantageously constructed in accordance with U.S. Pat. No. 4,386,822. The polarizer 160 is further connected to a fifth optical fiber segment 164 such that light incident to the polarizer 160 from the third optical fiber segment 140 is output from the polarizer 160 on the fifth optical fiber segment 164. As is known to one skilled in the art, a single-mode optical fiber, such the first optical fiber 114, typically propagates light in first and second orthogonal polarization modes. The polarizer 160 operates to block the light in one of the two polarization modes (e.g., the second polarization mode) and to transmit the light propagating in the other polarization mode (e.g., the first polarization mode) so that the light propagating in the fifth optical fiber segment 164 away from the polarizer 160 comprises light in substantially only the first polarization modes (i.e., polarized light).

The polarized light from the polarizer 160 propagates via the fifth optical fiber segment 164 to a port of a second directional coupler (DC) 170. The second directional coupler 170 couples the light to a sixth optical fiber segment 174 of the first optical fiber 114. The sixth optical fiber segment 174 is formed into a loop 178 which lies in a plane generally perpendicular to the axis around which the loop is to be rotated. The sixth optical fiber segment 174 returns to an adjacent port of the second directional coupler 170 which thus closes the loop 178. The first optical fiber 114 extends from the second directional coupler 170 to form a seventh optical fiber segment 190. The seventh optical fiber segment 190 is terminated by a second light-absorbing terminator (T) 194 which absorbs light propagating in the seventh optical fiber segment 190 so that it is not reflected back toward the second directional coupler 170.

The second directional coupler 170 is preferably constructed in a similar manner to the construction of the first directional coupler 124, as discussed above. The polarized light incident to the second directional coupler 170 from the fifth optical fiber segment 164 is divided into two substantially equal portions indicated by arrows as $I_{CW}$ and $I_{CCW}$ which propagate in the sixth optical fiber segment 174 around the loop 178 in a clockwise direction and a counterclockwise direction, respectively. The two counterpropagating light portions $I_{CW}$ and $I_{CCW}$ are recombined at the second directional coupler 170 to provide a loop optical output signal indicated by an arrow $I_{OUT}$. The combined optical energy from the two counterpropagating light signals is coupled to the fifth optical fiber segment 164 to propagate to the polarizer 160. A portion of the combined optical energy is coupled to the seventh optical fiber segment 190 and propagates to the second light-absorbing terminator 194 where it is absorbed. As is well known in the art, the ratio of the light output in the fifth and seventh segments depends upon the phase relationship of the counterpropagating light portions when they are recombined by the second directional coupler 170.

The light propagating back to the polarizer 160 from the second directional coupler 170 is again polarized so that only light propagating in the first polarization mode is transmitted through the polarizer to the third optical fiber segment 140. The polarized light from the polarizer 160 propagates to the first directional coupler 124 where it is split into two substantially equal portions, one of which is coupled to the second optical fiber segment 128 and the other of which is coupled to the first optical fiber segment 120. The light in the second optical fiber segment 128, represented by an arrow $I_{DET}$, propagates to an optical detector (D) 200 which detects the intensity of the optical energy in the second optical fiber segment 128 and thus detects the intensity of the combined optical energy from the loop 178. The detector 200 provides an electrical output signal on a line 204 that is responsive to the detected intensity. As is well known in the art, the intensity of the combined optical energy from the loop 178 depends upon the relative phases of the two counterpropagating optical signals, which in turn depends in part upon the rotation rate of the loop 178.

Various apparatus and techniques for converting the detected optical intensity to an output signal representing the magnitude and angular direction of rotation are disclosed in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. For example, a drive and detection electronics circuit block 210 is illustrated. The drive and detection electronics circuit block 210 provides an electrical output signal on a line 214 which is coupled to a phase modulator (M) 218. The phase modulator 218 is coupled to the sixth optical fiber segment 174 at a position offset from the center of the loop 178. The drive and detection electronics circuit block 210 drives the phase modulator 218 with a specific frequency that is selected to modulate the phase of the two counterpropagating optical signals $I_{CW}$ and $I_{CCW}$. The drive and detection electronics circuit block 210 further uses the specific frequency to synchronously demodulate the electrical representation of the optical output signal on the line 204 to provide an electrical output signal on a line 230 that represents the rotation rate of the loop 178. Additional details of the operation of the rotation sensor can be found in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. While the rotation sensor depicted in FIG. 1 is in closed loop configuration, it will be understood that other configurations, such as described in U.S. Pat. No. 4,779,975, may be utilized.

Figure 2:
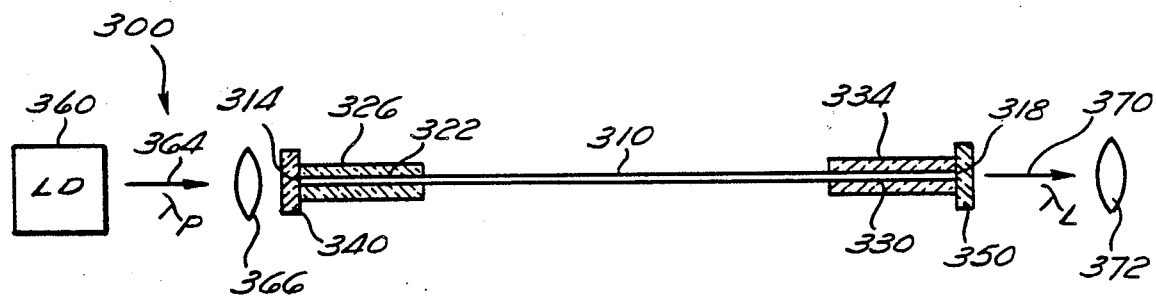
FIG. 2 is a schematic representation of one embodiment of a resonant cavity optical fiber laser of the present invention.

FIG. 2 illustrates an exemplary embodiment of a resonant cavity laser 300 constructed in accordance with the present invention which can be advantageously used as the light source 110 in FIG. 1. As illustrated, the laser 300 comprises an optical laser fiber 310 that is preferably a single-mode optical fiber, formed of a silica-glass optical fiber that is doped with Neodymium (Nd), or another suitable material, that lases to produce output light at an emission wavelength in response to a pump optical signal at a pump wavelength. For example, the optical fiber 310 may be doped with a concentration of Neodymium in the range of 0.1% to 1.0% by weight. In the embodiments described herein, the preferred optical fiber 310 comprises a conventional telecommunications type optical fiber of $GeO_2$-$SiO_2$, co-doped with approximately 1 mole percentage $P_2O_5$ and 300 parts per million Neodymium (Nd). The exemplary optical fiber 310 has a core radius of approximately 3 microns and a cladding radius of approximately 125 microns. The optical fiber 310 absorbs light at a peak absorption wavelength of 810 nanometers at a rate of approximately 13 dB per meter. Such an optical fiber 310 is manufactured by British Telecom Research Laboratories of Ipswich, England.

When pumped with an optical signal at a pump wavelength in the absorption range of Neodymium (e.g., approximately 790 nanometers to approximately 850 nanometers), at a sufficient intensity, the Neodymium doping emits light in an emission range of approximately 1050 nanometers to approximately 1080 nanometers, depending upon the pump wavelength and the pump intensity, as will be discussed more fully below. There are additional emissions of light in a range of wavelengths around 1400 nanometers; however, such emissions have substantially lower intensities.

The laser optical fiber 310 has a length that is preferably greater than one meter, and which may be as great as 300 meters. The optical fiber 310 has a first end 314 and a second end 318. A first end portion 322 of the optical fiber 310 proximate to the first end 314 is preferably enclosed within a first capillary tube 326 to provide support for the first end portion 322 and to provide a means for accurate alignment of the first end portion 322. Similarly, a second end portion 330 of the optical fiber 310 proximate to the second end 318 is preferably enclosed within a second capillary tube 334. The first end 314 and the second end 318 are precisely ground and polished so that the first end 314 and the second end 318 define flat planar surfaces that are substantially perpendicular to the longitudinal axes of the first end portion 322 and the second end portion 330, respectively. In preferred embodiments, the first capillary tube 326 is ground and polished at the same time as the first end 314 of the optical fiber 310 so that the end of the first capillary tube 326 is coplanar with the first end 314. Similarly, the second capillary tube 334 is ground and polished at the same time as the second end 318 of the optical fiber 310 so that the end of the second capillary tube 334 is coplanar with the second end 318.

The optical fiber resonant laser 300 includes a first mirror 340 that is mounted proximate to the first end 314 of the optical fiber 310. The first mirror 340 is advantageously a dichroic mirror having substantially no reflectivity at a first range of optical wavelengths, corresponding to the wavelengths of a pump signal, and having substantially 100% reflectivity at a second range of wavelengths, corresponding to the wavelengths of an emitted signal. The structure of such a dichroic mirror is known to the art. The dichroic first mirror 340 preferably has a flat reflective surface and is mounted with respect to the first end 314 so that the flat reflective surface of the first mirror 340 is parallel with the surface of the first end 314. Thus, a line normal to the flat reflective surface of the first mirror 340 is aligned with the longitudinal axis of the first end portion 322 of the optical fiber 310. In one embodiment of the invention, the first capillary tube 326 is advantageously used as a mounting surface for the first mirror 340 to provide the above-described alignment. The first mirror 340 may be attached to the first capillary tube 326 with a suitable adhesive. In a preferred embodiment of the invention, the first mirror 340 is fabricated by depositing reflective coatings directly on the first end 314 of the optical fiber 310.

The optical fiber resonant laser 300 includes a second dichroic mirror 350 that is mounted proximate to the second end 318 of the optical fiber 310. The second mirror 340 preferably reflects substantially no light in the first range of wavelengths. The second mirror 340 is a partially reflective mirror with respect to the second range of wavelengths. For example, the reflectivity of the second mirror for the second range of wavelengths is advantageously selected to be in the range of 90% to 95%. The structure of such a partially reflective mirror is known to the art. The partially reflective second mirror 350 preferably has a flat reflective surface and is mounted with respect to the second end 318 so that the flat reflective surface of the second mirror 350 is parallel with the surface of the second end 318. Thus, a line normal to the flat reflective surface of the second mirror 350 is aligned with the longitudinal axis of the second end portion 330 of the optical fiber 310. The second capillary tube 334 is advantageously used as a mounting surface for the second mirror 350 to provide the above-described alignment. In one embodiment of the invention, the second mirror 350 may be attached to the second capillary tube 334 with a suitable adhesive. In the preferred embodiment, the second mirror 350 is fabricated by depositing reflective coatings on the second end 318 of the optical fiber 310.

The optical fiber resonant laser 300 further includes an optical pump source 360 that is preferably a laser diode (LD), for example. The optical pump source 360 generates a pump optical signal, represented by an arrow 364, at a wavelength $\lambda_P$, which corresponds to a selected one of the first wavelengths in the absorption range of the Neodymium doping of the optical fiber 310. The selection of the selected one of the first wavelengths is an element of the invention described herein and will be discussed more fully below.

The optical pump source 360 is aligned with respect to the first dichroic mirror 340 and the longitudinal axis of the first end portion 322 of the optical fiber 310 so that the pump optical signal 364 passes through the first dichroic mirror 340 with substantially no reflection or refraction and is introduced into the first end portion 322 of the optical fiber 310 via the first end 314. The pump optical signal 364 may be focused on the longitudinal axis of the first end portion 322 of the optical fiber 310 by a first lens 366, as illustrated in FIG. 2. Alternatively, in the preferred embodiment having the first mirror 340 directly deposited on the first end 314, the first end 314 can be positioned proximate to the output of the pump source 360 (e.g., by butt-coupling the pump source output to the first end 314 with a small space in between to avoid scratching the reflective coating).

The pump optical signal 364 introduced into the first end portion 322 propagates in the optical fiber 310 towards the second end 318. As the pump optical signal 364 propagates toward the second end 318, the optical energy of the pump optical signal 364 is absorbed by the Neodymium doping ions of the optical fiber 310, causing the ions to change state. When the ions relax (i.e., return to their original stable state), photons are emitted at an emission wavelength that is longer than the pump wavelength. This emission effect is known to the art and has been used to advantage to produce superfluorescent broadband sources by pumping a Neodymium-doped fiber with a pump optical signal of sufficient intensity to cause spontaneous emission in a random manner so as to provide an output signal having a low temporal coherence. See, for example, U.S. Pat. No. 4,637,025. Such superfluorescent broadband sources are specifically constructed so that the emitted light passes directly out of the second end of the optical fiber, or, at most, is reflected at the first end and then passes out of the second end without further reflection. Thus, such superfluorescent broadband sources do not operate in the same manner as resonant cavity lasers.

In the present invention, the spontaneously emitted light that is initially directed toward the first end 314 of the optical fiber 310 and thus directed toward the first dichroic mirror 340 will be reflected back toward the second end 318 and thus toward the second dichroic mirror 350. This reflected light, along with any spontaneously emitted light that was initially directed toward the second end 318 will be partially reflected by the partially reflective second dichroic mirror 350. In other words, approximately 90-95% of the light propagating toward the second dichroic mirror 350 will be reflected back toward the first end 314. The other 5-10% of the light propagating toward the second dichroic mirror 350 will be transmitted through the second dichroic mirror 350 and will be emitted from the resonant laser 300 as a laser output signal at a wavelength $\lambda_L$, represented by an arrow 370. In one embodiment, the laser output signal 370 is focused on the input end of the input end portion 120 of the optical fiber 114 of FIG. 1 by a second lens 372 which is aligned with the longitudinal axis of the second end portion 330 of the optical fiber 310. Alternatively, in a preferred embodiment of the invention, wherein the second mirror 350 is fabricated by deposition of reflective coatings on the second end 318, the second end 318 can be butt-coupled to the input end of the input end portion 120 of the optical fiber 114.

The light reflected back toward the first end 314 will again be reflected by the first dichroic mirror 340 so that it once again propagates toward the second end 318. This same process will be repeated for additional light that is spontaneously emitted by the Neodymium doping ions in response to the continuing input of the pump optical signal 364 from the optical pump source 360. Thus, the first dichroic mirror 340, the second dichroic mirror 350 and the optical fiber 310 therebetween define a cavity within which the laser light oscillates. The oscillating laser light within the cavity stimulates the emission of additional photons from the Neodymium ions and thus increases the intensity of the emitted laser light.

Structures similar to the above-described structure of FIG. 2 have been heretofore used to provide a resonant cavity laser. However, it has been previously taught that such resonant cavity lasers provide a laser output signal having a narrow linewidth. Briefly, the oscillating laser light within the cavity will resonate when the round trip optical path length (e.g., twice the length of the cavity between the two mirrors in FIG. 2) is a multiple of the wavelength of the emitted light. Thus, there will be preferential generation of additional photons at the resonant wavelengths. For example, such a structure can be used to generate a laser output signal having a linewidth in the range of 2-6 nanometers when pumped with an optical pump signal in the range of 800-815 nanometers. This range, referred to as the pump variable tuning range of a Neodymium-doped silica fiber, corresponds to laser output signals in the range of 1054-1072 nanometers. Within this range, the range of laser output wavelength $\lambda_L$ will increase as the optical pump wavelength $\lambda_P$ is increased, while the narrow linewidth of the laser output remains relatively constant.

Applicants have discovered that when an optical pump signal is applied to the Neodymium-doped silica fiber 310 at a pump wavelength $\lambda_P$ that is sufficiently outside the pump variable tuning range of the laser fiber 310, the optical output signal 370 thus produced by the lasing action of the Neodymium doping ions has a surprisingly broad linewidth. For example, when the optical fiber 310 is pumped with an optical pump signal 364 having a wavelength $\lambda_P$ in the range of approximately 815 nanometers to approximately 825 nanometers, the wavelength $\lambda_L$ of the laser output signal 370 includes a broad range of wavelengths that does not vary significantly over this 815-825 nanometer range of wavelengths of the pump optical signal. For example, the laser output signal 370 includes a range of wavelengths from approximately 1055 nanometers to approximately 1075 nanometers, with a measured linewidth of approximately 18-19 nanometers full width at half maximum (FWHM). This same broadening effect on the line width has been discovered at wavelengths of the pump optical signal 364 below the pump variable tuning range. For example, at a pump wavelength $\lambda_P$ of approximately 794 nanometers, the linewidth of the laser output signal 370 has been measured as approximately 15 nanometers, with the range of wavelengths being approximately 1053 nanometers to approximately 1068 nanometers. For reasons discussed below, the optical pump wavelength $\lambda_P$ is preferably selected to be approximately 822 nanometers.

Figure 3A:
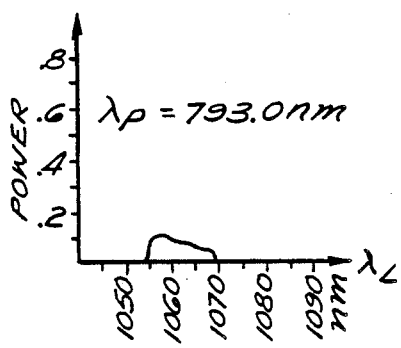
FIGS. 3a-3o are graphical representations of the output spectrum generated by the resonant cavity optical fiber laser of FIG. 2 for various input pump wavelengths showing the broadening of the spectral linewidth when the fiber laser is pumped with an optical pump signal outside the pump variable tuning range of the fiber laser.
Figure 3B:
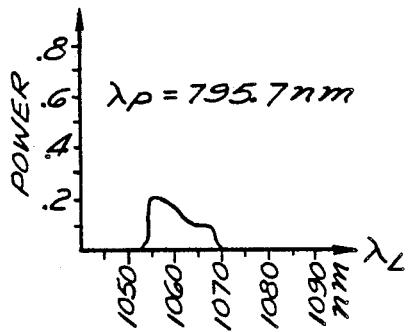
Figure 3C:
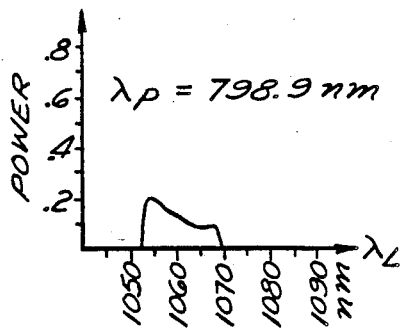
Figure 3D:
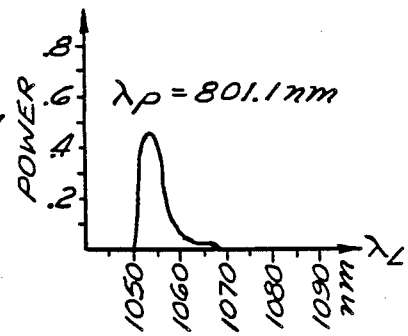
Figure 3E:
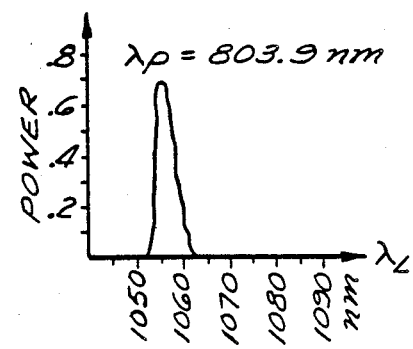
Figure 3F:
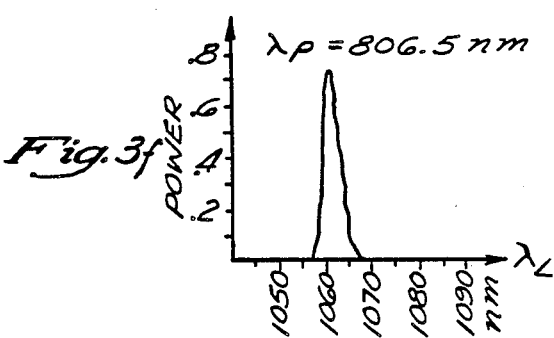
Figure 3G:
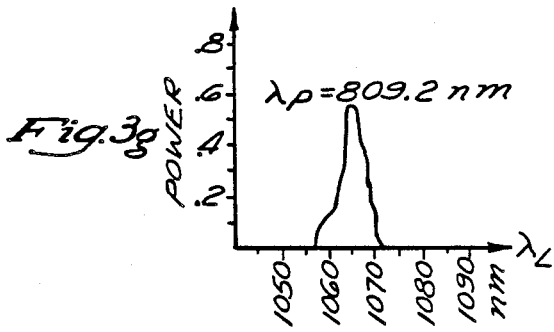
Figure 3H:
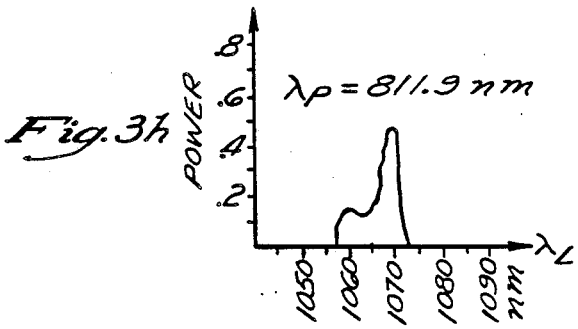
Figure 3I:
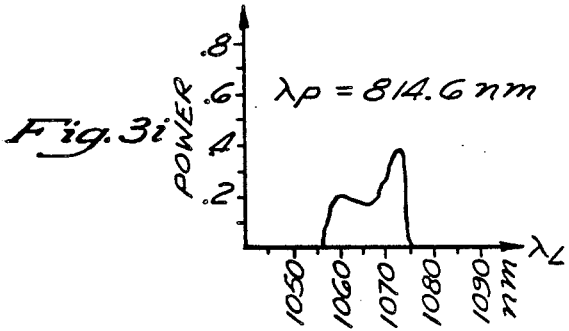
Figure 3J:
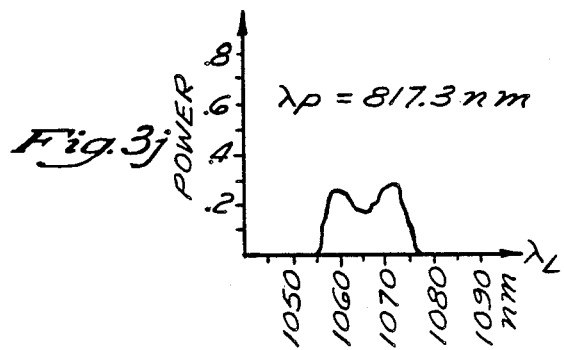
Figure 3K:
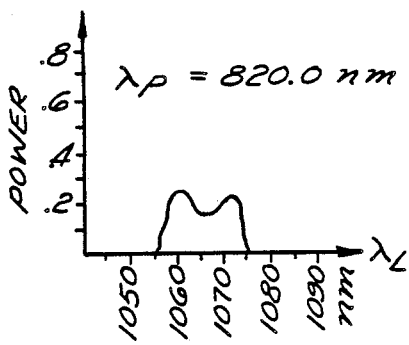
Figure 3L:
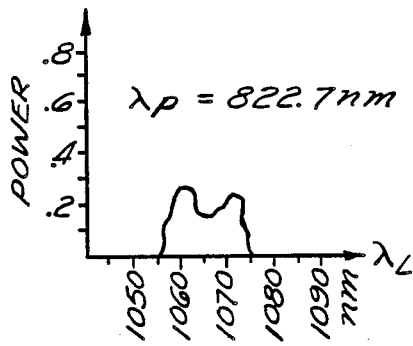
Figure 3M:
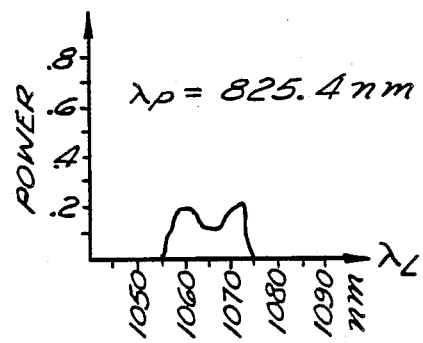
Figure 3N:
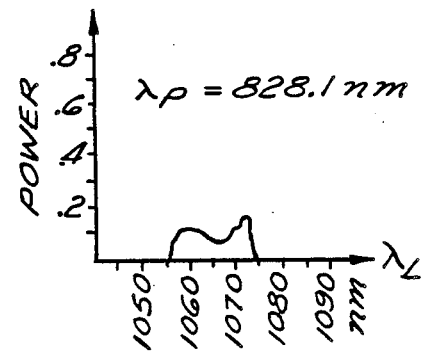
Figure 3O:
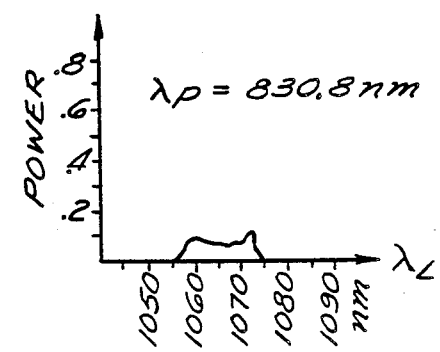

The foregoing can be visualized by referring to FIGS. 3a-3o which are graphs of the laser output emission spectrum. These graphs depict the measured power in the laser output signal 370 versus the wavelength $\lambda_L$ of the laser output signal 370 for fifteen different wavelengths $\lambda_P$ of the optical pump signal 364. The pump wavelengths range from approximately 793 nanometers to approximately 831 nanometers. The horizontal scale in each graph is the output wavelength $\lambda_L$ in nanometers and the vertical scale is the output power. The units of the vertical scale are not indicated as the output power was measured with a photodetector which was not calibrated to absolute power. Thus, the units on the vertical scale are arbitrary units so that the power output for each input wavelength $\lambda_P$ can be compared.

FIGS. 3d-3h represent the laser output spectrum for input pump wavelengths $\lambda_P$ of approximately 801.1 nanometers, 803.9 nanometers, 806.5 nanometers, 809.2 nanometers and 811.9 nanometers, respectively. This range of input pump wavelengths is generally referred to as the pump variable tuning range of the optical laser. It can be seen that as the input pump wavelength $\lambda_P$ increases the average wavelength of the output wavelength spectrum increases. At the same time, the optical bandwidth of the spectrum, as measured at half magnitude (i.e., full width at half magnitude (FWHM)), remains relatively narrow over the range (e.g., approximately 5-8 nanometers over the range).

It can be seen that at wavelengths above and below the pump variable tuning range, the laser output spectrum starts broadening. Thus, there are upper and lower broadband regions at each end of the pump variable tuning range. For example, in FIG. 3c, which represents the laser output spectrum for an optical pump wavelength $\lambda_P$ of 798.9 nanometers, the optical bandwidth has expanded to approximately 15 nanometers when measured FWHM. The optical bandwidth remains larger than the bandwidth in the pump variable tuning region as pump wavelength $\lambda_P$ is decreased as illustrated in FIGS. 3b and 3a for wavelengths of 795.7 and 793.0, respectively.

In like manner, FIGS. 3i-3o illustrate the output spectrum corresponding to pump wavelengths above the pump variable tuning range of the optical fiber laser 300. It can be seen that the output spectrum bandwidth broadens to approximately 16-18 nanometers and remains relatively constant as the pump wavelength $\lambda_P$ is increased. Moreover, the bandwidth is substantially greater than the bandwidth in the pump variable tuning region of the laser optical fiber 310.

It will be observed that the magnitude of the output spectrum is lower in both the upper and the lower broadband regions (depicted by FIGS. 3a-3c and 3i-3o, respectively) than in the pump variable tuning range (depicted by FIGS. 3d-3h). This decrease in magnitude is a consequence of the fact that the broadband regions are characterized by pump wavelengths which are not coincident with the peak absorption wavelength of the Neodymium lasing medium. However, the magnitude is sufficiently large to provide reasonable output power. Further, in practice, it is possible to compensate for the decreased absorption by increasing the length or dopant concentration of the lasing fiber. Advantageously, the magnitude is also reasonably constant in the range of approximately 820-830 nanometers, and thus, is substantially insensitive to pump wavelength variations in this range.

In preferred embodiments of the invention, the above-described broadening yields an emission bandwidth at least 50% greater than the emission bandwidth associated with a pump wavelength within the pump variable tuning range of the laser fiber 310. The broadening of the spectral bandwidth occurs when the laser fiber 310 is pumped with an optical pump signal 364 having a wavelength $\lambda_P$ that is substantially above or substantially below a local peak absorption wavelength of the lasing material. This broadening can be attributed to site-dependent pumping of the Neodymium ions in the silica glass of the optical fiber 310. The transitions between energy levels in the Neodymium ions are strongly inhomogeneously broadened as a result of the multiplicity of atomic sites available to the Neodymium ions in the silica glass. (See, for example, C. Brecher, et al., "Line-narrowed spectra and site-dependent transition probabilities of $Nd^{3+}$ in oxide and fluoride glasses," *PHYSICAL REVIEW B*, Vol. 18, No. 10, 15 November 1978, pp. 5799-5811.) Site dependent pumping implies that ions residing in certain sites (and also emitting around a specific wavelength) are preferentially excited by narrowband pumping at a particular wavelength. This dependence, as well as details of the spectrum, are therefore expected to depend on the nature and concentration of the co-dopants present in the core of the optical fiber 310. The broader emission is believed to be due to the excitation of multiple $Nd^{3+}$ sites. Thus, the broader emission occurs when the pump wavelength $\lambda_P$ lies away from the center of the 810-nanometer absorption band of the Neodymium lasing material. Under such conditions, the excitation of multiple $Nd^{3+}$ sites takes place through site-dependent absorption tails belonging to either the same bands or to adjacent absorption bands (e.g., the 810-nanometer and 870-nanometer absorption bands of $Nd^{3+}$), or through cross-relaxation between upper laser levels of the Neodymium.

Figure 4:
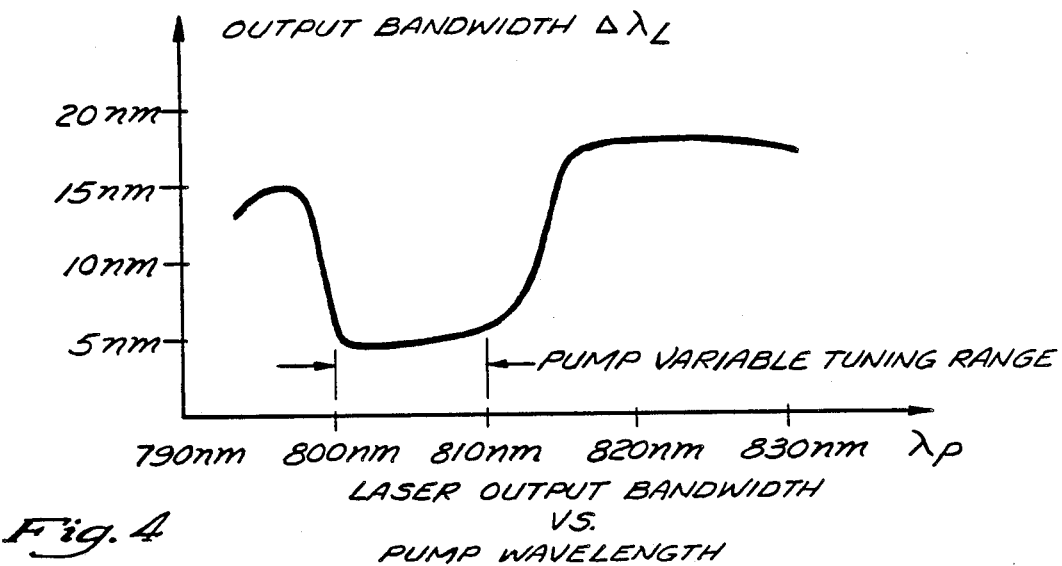
FIG. 4 is a graphical representation of the laser output bandwidth $\alpha\lambda_L$ versus the pump wavelength $\lambda_P$.
Figure 5:
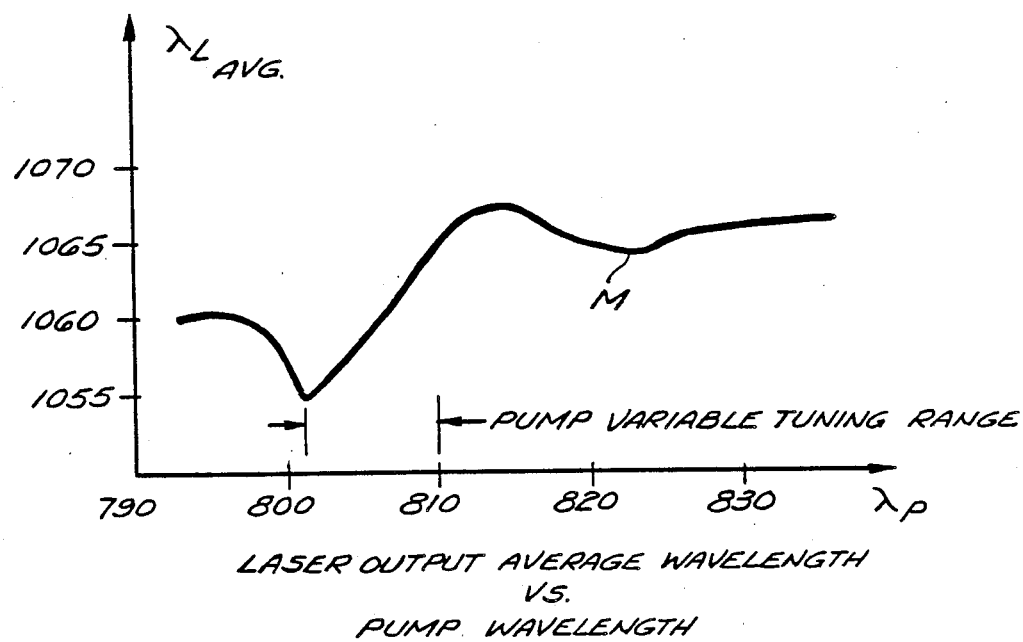
FIG. 5 is a graphical representation of the laser output average wavelength $\lambda_L^{AVG}$ versus the pump wavelength $\lambda_p$.

The foregoing is summarized in FIGS. 4 and 5, which are derived from FIGS. 3a-3o and represent the laser output bandwidth and the laser output average wavelength, respectively, as a function of pump wavelength $\lambda_P$. As used herein, the average wavelength $\lambda_L^{AVG}$ is defined as follows:

$$\lambda_{LAVG} = \frac{\int \lambda I(\lambda) d\lambda}{\int I(\lambda) d\lambda}$$

where $I(\lambda)$ is the intensity at a particular wavelength and the two integrals are taken over the spectral bandwidth.

In FIG. 4, it can be seen that the laser output bandwidth $\alpha\lambda_L$ is relatively small (e.g., approximately 6-8 nanometers) in the pump variable tuning range of approximately 800-810 nanometers for the input pump wavelength $\lambda_P$. $\alpha\lambda_L$ then increases rapidly to approximately 16-20 nanometers as the pump wavelength is increased above the pump variable tuning range. Similarly, the output bandwidth $\alpha\lambda_L$ increases as the pump wavelength $\lambda_P$ is decreased below the pump variable tuning range.

In FIG. 5, it can be seen that the average wavelength $\lambda_L^{AVG}$ of the laser output wavelength $\lambda_L$ increases approximately linearly in the pump variable tuning range from approximately 801-812 nanometers, and reaches a maximum average wavelength of approximately 1067 nanometers at a corresponding pump wavelength $\lambda_P$ of approximately 814 nanometers. Thereafter, the laser output average wavelength $\lambda_L^{AVG}$ decreases to a local minimum value M of approximately 1065 nanometers at a corresponding pump wavelength $\lambda_P$ of approximately 822 nanometers.

It can also be seen in FIGS. 4 and 5 that the average wavelength $\lambda_L^{AVG}$ and the bandwidth $A\lambda_L$ for the laser output spectrum are both substantially constant in the broadband region above the pump variable tuning range of the optical fiber laser 300 around 822 nanometers. Thus, small variations in the input pump wavelength $\lambda_P$ around 822 nanometers have little effect on either the average wavelength $\lambda_L^{AVG}$ or the bandwidth $\alpha\lambda_L$. The optical pump wavelength $\lambda_P$ should preferably be selected to provide an output average wavelength $\lambda_L^{AVG}$ and bandwidth $\alpha\lambda_L$ which is substantially insensitive to fluctuations in the pump wavelength $\lambda_P$, and thus, in the preferred embodiment, the pump wavelength $\lambda_P$ is selected to be approximately 822 nanometers.

The relative stability of the output wavelength $\lambda_L$ with respect to minor variations in the pump wavelength $\lambda_P$ is advantageous for providing a stable operating wavelength for the optical energy source for the fiber optic rotation sensor described above in connection with FIG. 1. The wavelength stability of an optical fiber laser 300 constructed in accordance with FIG. 2 has been estimated to be better than 10 parts per million per °C. when the laser is operated about the local average wavelength minimum M (FIG. 5) at the input pump wavelength of approximately 822 nanometers. This is considerably better than the stability of a typical superluminescent diode, which is likely to be in the range of 300–400 parts per million per °C., and also better than the stability of a typical diode laser source which is likely to be approximately 300 parts per million per °C. Thus, although the optical fiber laser 300 of FIG. 2 is pumped with an optical pump source 360 which may be a laser diode, or the like, having a relatively large variation in wavelength with temperature, the operation of the optical fiber laser 300 at the minimum in the average emission wavelength at a pump wavelength $\lambda_P$ of approximately 822 nanometers effectively reduces the temperature dependence to approximately 10 parts per million per °C.

The optical fiber laser of the present invention has other advantages over the previously known broadband sources, such as superluminescent diodes. One of the problems associated with superluminescent diodes is that the optical energy output is not well-directed. Thus, it is difficult to capture a large percentage of the light output from the superluminescent diode and provide it as an input to a rotation sensor, or the like. In contrast, the light output from the optical fiber laser 300 of FIG. 2 is highly directional and substantially all of the light emitted from the optical fiber laser 300 can be provided as an input to the rotation sensor 100 of FIG. 1, for example.

The optical fiber laser 300 of FIG. 2 also has advantages over the superfluorescent fiber lasers, such as the laser described in U.S. Pat. No. 4,637,025. The resonant cavity of the present invention allows the lasing effect to occur at a considerable lower absorbed input pump power threshold than occurs for the superfluorescent laser. Thus, the optical output power generated for a given absorbed input pump power is considerably greater than for a superfluorescent laser using a similar lasing fiber.

Although described above as a spectral bandwidth, it should be understand that the spectrum of the emitted laser light is not a continuous spectrum as one would expect to see with a superfluorescent laser, or the like. Rather, the emission spectrum comprises an envelope having a large plurality of wavelengths that are resonant in the laser fiber cavity formed by the first and second mirrors 340 and 350. Each of the resonant wavelengths corresponds to a longitudinal mode of the optical fiber laser 300. Each of the longitudinal modes has a very narrow linewidth as one would expect with a resonant cavity laser, and the individual wavelengths together provide the spectral envelopes shown in FIGS. 3a–3o. In order to provide a suitable broadband output, the spectral envelope should not only have a relatively wide bandwidth, but also should include many closely spaced modes. This close mode spacing is achieved in the present invention by sizing the resonant cavity of the fiber laser 300 to support a minimum of at least thousands of modes and preferably tens of thousands of modes.

Figure 6:
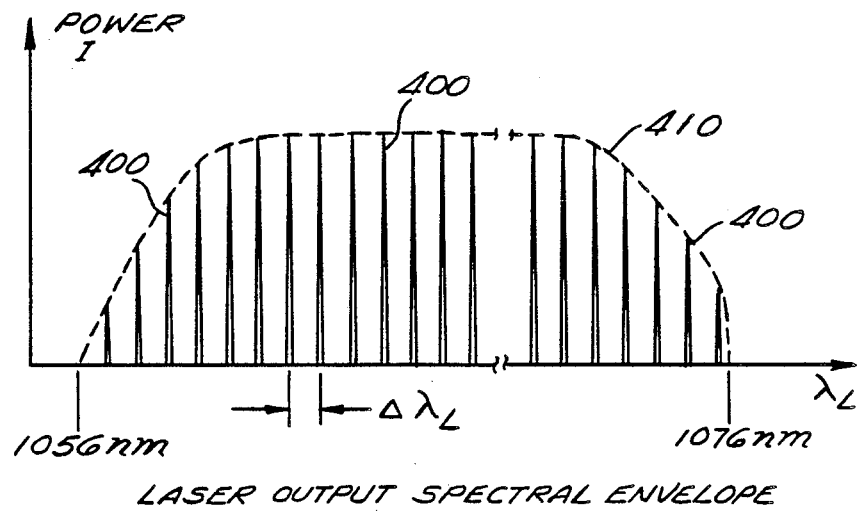
FIG. 6 is a graphical representation of the laser output spectral envelope showing the longitudinal modes that comprise the envelope.

The foregoing is graphically represented in FIG. 6, wherein a plurality of individual longitudinal modes 400 are shown in the range of wavelengths between 1056 nanometers and 1076 nanometers. Although a relatively small number of individual modes are illustrated in FIG. 6, it is estimated that the preferred embodiment has in excess of 50,000 individual modes in the illustrated range. The individual modes together form a spectral bandwidth envelope 410 (illustrated by a dashed line) which generally corresponds to the spectral bandwidths illustrated in FIGS. 3i–3o. The spacing between the modes ($\alpha\lambda_L$) will vary in accordance with the two adjacent wavelengths and may be in the range of $10^{-4}$ to $10^{-3}$ nanometers, for example.

An optical fiber, such as is used in the rotation sensor 100 of FIG. 1, propagates light in two orthogonal polarization modes, having different refractive indices. The two polarization modes, referred to herein as $P_X$ and $P_Y$, respectively, provide two different propagation paths for light traversing the loop 178. Light travelling in one direction around the loop 178 in polarization mode $P_X$ will travel an effective distance $n_X L_S$ where $n_X$ is the refractive index for the $P_X$ polarization mode and $L_S$ is the length of the optical fiber 114 in the loop 178 of the rotation sensor 100. The loop length $L_S$ is measured from the center of the directional coupler 170, around the loop 178, and back to the center of the directional coupler 170. The term "center" of the coupler 170 means the point at which the waveguides forming the coupler 170 are juxtaposed to provide coupling.

Light travelling the same direction around the loop 178 in the other of the two polarization modes (i.e., $P_Y$) will travel an effective distance $n_Y L_S$, where $n_Y$ is the refractive index of the optical fiber 114 for the $P_Y$ polarization mode. Because of the differences in the propagation paths travelled by the optical energy in the two polarization modes, there will be a path length difference between the optical energy in one of the polarization modes with respect to light in the other of the two polarization modes. The optical path difference $\alpha_L{}^S$ is equal to $n_X L_S - n_Y L_S$ or:

$$\alpha_L{}^S = (n_x - n_y) L_S$$

In an exemplary optical fiber rotation sensor 100, the optical path difference $\alpha_L{}^S$ is approximately 50–100 centimeters.

It has been found that optical sensors, such as the rotation sensor of FIG. 1, are susceptible to certain errors caused by the coupling of optical energy from one of the two polarization modes to the other of the two polarization modes in the fiber loop. In order to reduce some of these errors, it has been found to be advantageous to use an optical source 110 having a coherence length that is orders of magnitude less than the optical path difference $\alpha_L{}^S$ for the loop 178. (See, for example, U.S. Pat. No. 4,634,282.) Although the laser output signal 370 from the fiber laser 300 comprises a plurality of individual modes having narrow linewidths, the fiber laser 300 provides an effective broadband output having a coherence length sufficiently short to meet this requirement.

Figure 7:
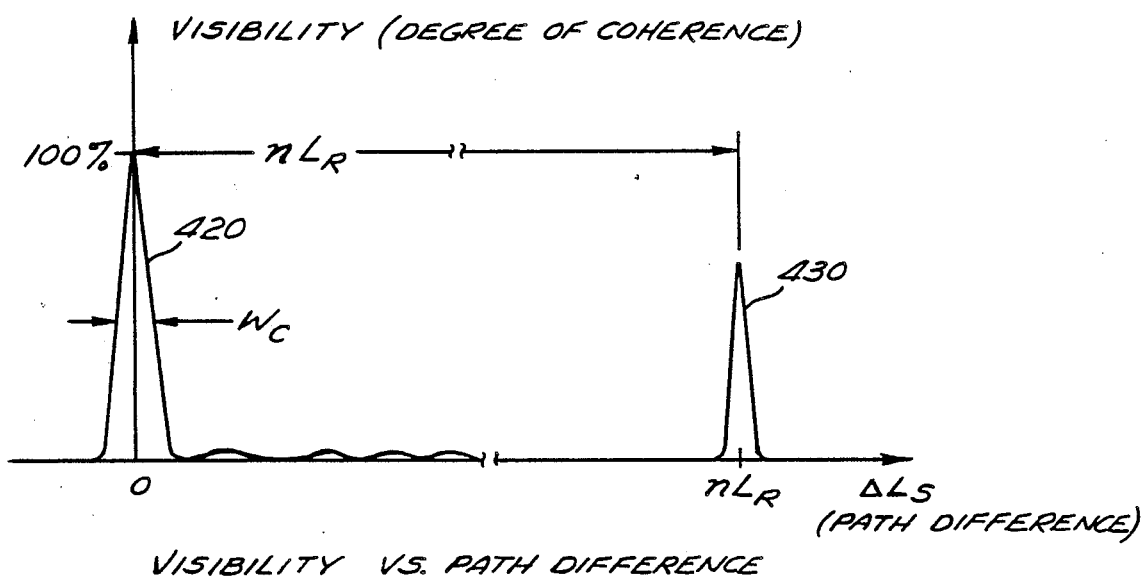
FIG. 7 is a graphical representation of the visibility (degree of coherence) versus the optical path difference for the output of the laser optical fiber of the present invention.

The coherent characteristics of the laser 300 are illustrated in FIG. 7 which is a diagram of the coherence function of the optical fiber laser 300 of FIG. 2. The visibility (i.e., degree of coherence) is plotted as a function of optical path difference. As illustrated in FIG. 7, the individual modes that comprise the spectral envelope produce a coherence function that has a first coherence peak 420 for differential path lengths of zero. The width $W_C$ of the first coherence peak 420 (i.e., the full width of the peak at half magnitude) depends on the spectral bandwidth of the laser emission envelope. In the embodiment of FIG. 2, the coherence width $W_C$ is on the order of tens of microns.

The coherence function of FIG. 7 has a second coherence peak 430 when the path difference is equal to $nL_R$, where $L_R$ is the length of the resonant cavity of the fiber laser 300 and $n$ is the refractive index of the optical path travelled by the light through the laser cavity (e.g., the optical path formed by the optical laser fiber 310 of FIG. 2 at the laser emission wavelength). As used herein, the term "length of the resonant cavity" is defined as being the round trip distance travelled through the laser cavity, which, in the embodiment of FIG. 2, is equal to twice the distance between the first mirror 340 and the second mirror 350. The distance between the coherence function peaks varies inversely with the spacing between the individual modes in the emission envelope, and this distance will be referred to hereinafter as the coherence peak spacing. It is advantageous that the coherence peak spacing be at least thousands of times the coherence peak width $W_C$, and, in preferred embodiments, the coherence peak spacing is on the order of tens of thousands of times the coherence peak width. The coherence function has further coherence peaks (not shown) that are serially spaced apart by this coherence peak spacing. In the embodiment of FIG. 2, which has a length between the two mirrors of approximately one meter, the coherence peak spacing will be greater than two meters. The second and subsequent coherence peaks arise by virtue of the fact that the fiber laser is a resonant cavity laser. Those skilled in the art will understand that these additional peaks do not exist for superfluorescent lasers or superluminescent diodes.

In order to avoid unwanted coherence effects associated with the second coherence peak 430 on crosscoupled polarization components, the optical path difference $\alpha_L^S$ for the loop 178 should be selected to be less than the coherence peak spacing of the fiber laser 300 (i.e., less than $nL_R$). Accordingly, an optical signal propagating in the rotation sensor 100 of FIG. 1 generated by the fiber laser source 300 of FIG. 2 will "see" only the first coherence peak 420 and will not "see" the second coherence peak 430 or any subsequent coherence peaks. Thus, insofar as the operation of the rotation sensor 100 is concerned, the width $W_C$ of the first coherence peak 420 is the coherence length of the optical fiber laser 300. In this case, the optical fiber laser 300 provides a laser output signal to the rotation sensor 100 that has an effectively continuous spectrum within the spectral envelope 410 although the envelope 410 comprises the individual modes 400. In the exemplary optical fiber laser 300 of FIG. 2, the coherence peak spacing $nL_R$ is greater than two meters and is thus substantially greater than the $\alpha_L^S$ of 50 to 100 centimeters for the rotation sensor of FIG. 1.

For additional information regarding the coherence function, see R. E. Epworth, "THe Temporal Coherence of Various Semiconductor Light Sources Used in Optical Fibre Sensors," *Fiber-Optic Rotation Sensors and Related Technologies*, S. Ezekiel, et al., editors, Springer-Verlag, 1982 (ISBN 3-540-11791-1 and 0-387-11791-1), pp. 237–244.

Alternative Embodiments

Although described above in connection with FIG. 2, it should be understood that the optical fiber laser of the present invention can be constructed in accordance with other embodiments. For example, FIG. 8 illustrates an alternative optical fiber laser 500 in which the resonant cavity is formed with a lasing optical fiber 510 by utilizing a multiplexing coupler 520. One preferred multiplexing coupler 520 is described in U.S. Pat. No. 4,556,279. The lasing optical fiber 510 is preferably an optical fiber such as was described above in connection with the embodiment of FIG. 2.

As described in the referenced patent, the preferred multiplexing coupler 520 is formed by juxtaposing two fibers so as to provide four ports, A, B, C and D. Ports A and B are directly connected within the coupler 520 by a first optical fiber coupler segment 522 of the lasing fiber 510 so that light entering port A of the coupler propagates through the first optical fiber coupler segment 522 and exits via port B. In like manner, ports C and D are connected within the coupler 520 by a second optical fiber coupler segment 524 of the lasing fiber 510 so that light entering port C propagates through the second optical fiber coupler segment 524 and exits via port D.

The first and second optical fiber coupler segments 522 and 524 are juxtaposed within the multiplexing coupler 520 so that a portion of the light entering port A will be coupled within the coupler 520 and will exit via port D rather than port B. Similarly, a portion of the light entering port C will be coupled within the coupler 520 and will exit port B rather than port D. In the multiplexing coupler 520, the percentage of the light coupled from port A to port D and the percentage of light coupled from port C to port B can be adjusted so that it is wavelength dependent, as described in U.S. Pat. No. 4,556,279. For example, in the embodiment of FIG. 8, the multiplexing coupler 520 is advantageously constructed to couple approximately 90–95% of light having an optical wavelength in the range of 1050 nanometers to 1070 nanometers from port A to port D and from port C to port D. At the same time, the multiplexing coupler 520 is constructed to couple substantially smaller percentage (preferably, zero or close to zero percent) of the light having an optical wavelength in the range of 800–830 nanometers.

The optical fiber 510 includes a first end 530 into which an input pump optical signal 532 is introduced from an optical pump source 534, preferably via a focusing lens 536. The optical pump source 534 is advantageously a laser diode or the like that provides a pump wavelength $\lambda_P$ of approximately 822 nanometers, as before. An input segment 540 of the optical fiber 510 interconnects the first end 530 with the port A of the multiplexing coupler 520. The optical fiber 510 continues through the multiplexing coupler 520 between the port A and the port B as the first optical fiber coupler segment 522. The optical fiber 510 includes a loop segment 542 which interconnects the port B with the port C. The optical fiber 510 continues through the multiplexing coupler 520 between the port C and the port D as the second optical fiber segment coupler segment 524. The optical fiber 510 extends from the port D as an output segment 544.

The input pump optical signal 532 propagates from the input end 530 of the optical fiber 510 via the input end segment 540 to the port A of the multiplexing coupler 520. Since the input pump signal has a wavelength of approximately 822 nanometers, very little, if any, of the input pump signal is coupled from the first coupler strand 522 to the second coupler strand 524. Thus, substantially all of the input pump signal exits the multiplexing coupler 520 via the port B and enters the loop segment 542. As the input pump signal propagates around the loop segment 542, it pumps the lasing optical fiber 510 which emits light in the wavelength range of approximately 1055 to 1075 nanometers, as discussed above in connection with FIG. 2. The emitted light stimulates the emission of additional light in the same wavelength range. The emitted light and any unabsorbed pump light propagate to the port C of the multiplexing coupler 520 and enter the second coupler segment 524. Since the percentage of coupling at the pump light wavelength is very small, substantially all of the residual pump light remains in the second coupler segment 524 and exits the multiplexing coupler 520 via the port D. On the other hand, approximately 90-95% of the laser light in the wavelength range of 1055 to 1075 nanometers is coupled from the second coupler segment 524 to the first coupler segment 522 and exits via the port B to propagate in the loop segment 542. The uncoupled 5-10% of the laser light exits via the port D and is output via the output end segment 544 as a laser output signal 550. The laser output signal 550 can be coupled by suitable means (e.g., butt coupling) to the input of the optical fiber rotation sensor 100 of FIG. 1 to provide a broadband source for the rotation sensor. This embodiment is particularly advantageous in that the output end segment 544 of the laser 500 can be spliced directly to the input end portion 120 of the rotation sensor 100, for example.

The portion of the emitted laser light that is coupled back into the loop segment 542 stimulates the emission of additional laser light at wavelengths in the broadband spectral envelope, as discussed above. The length of the loop segment 542 defines the length of a resonant cavity which determines which particular longitudinal modes of the resonant cavity laser 500 are reinforced by the recirculation in the loop segment 542. The length of the loop segment 542 is defined as the length of the optical path from the center of the first coupler strand 522 in the multiplexing coupler 520 around the loop segment 542 and back to the juxtaposed center of the second coupler strand 524.

It should be understood that it is desirable that substantially all the input pump energy be absorbed within the loop segment 542. Thus, the input end segment 540 of the optical fiber 510 should be sufficiently short so that substantially all of the pump energy is absorbed in the loop segment 542. In an alternative embodiment (not shown), the input segment 540, the first coupler strand 522, the second coupler strand 524 and the output segment 544 can comprise a non-lasing optical fiber so that little, if any, pump energy is absorbed by those portions of the embodiment. In the alternative embodiment, the loop segment 542 is spliced by conventional splicing methods to the first coupler strand 522 and the second coupler strand 524 proximate to the port B and the port C of the multiplexing coupler 520 so that only the loop segment comprises the lasing optical fiber 510. Thus, a conventional multiplexing coupler constructed from non-lasing fiber can be used for this alternative embodiment.

FIG. 9 discloses an alternative embodiment of a optical fiber laser 600 constructed in accordance with the present invention. The laser 600 includes a lasing optical fiber 610 such has been previously described. In addition, the laser 600 includes a non-lasing optical fiber 614 which is used to provide input and output connections, as will be discussed below. The lasing optical fiber 610 and the non-lasing optical fiber 614 are juxtaposed in a multiplexing coupler 620 such as was described above in connection with FIG. 8. The non-lasing optical fiber 614 has a first end 630 into which a pump optical signal 634 is introduced from a pump source 638, which is advantageously a laser diode or other optical energy source operating at approximately 822 nanometers. The pump optical signal 634 can focused onto the first end 630 of the non-lasing optical fiber 614 by a focusing lens 640. In preferred embodiments, the first end 630 is butt-coupled to the optical fiber output of a suitable pump source 638 providing such an optical fiber output. An input end portion 644 of the non-lasing optical fiber 614 interconnects the first end 630 with a port A of the multiplexing coupler 620. A coupler portion 648 of the non-lasing optical fiber 614 interconnects the port A of the multiplexing coupler 620 with a port B and thus to an output end portion 650 of the non-lasing optical fiber 614. The output end portion 650 interconnects the port B of the multiplexing coupler 620 with a second end 654 of the non-lasing optical fiber 614. The second end 654 is advantageously butt-coupled to the input end of the rotation sensor 100 of FIG. 1.

Within the multiplexing coupler 620, the coupler portion 648 of the non-lasing optical fiber 614 is juxtaposed with a coupler portion 660 of the lasing optical fiber 610. The coupler portion 660 of the lasing optical fiber 610 interconnects a port C and a port D of the multiplexing coupler 620. The port C of the multiplexing coupler 620 is connected to a first short cavity segment 670 of the lasing optical fiber 610 which is terminated with a first end 672. As described above in connection with FIG. 2, a first mirror 674 is positioned proximate to the first end 672 and is aligned so that light exiting the first end 672 is reflected back into the first end 672 to propagate back to the port C of the multiplexing coupler 620. A first end portion 676 is defined proximate to the first end 672. Preferably, the first end portion 676 is supported by a first capillary tube 678, or the like. The first mirror 674 can be secured to the first capillary tube, as described above in connection with FIG. 2, or, preferably, fabricated onto the first end 672 by deposition of reflective coatings.

In like manner, the port D of the multiplexing coupler 620 is connected to a second longer lasing segment 680 of the lasing optical fiber 610. The second lasing segment 680 is terminated by a second end 682 which is aligned with a second mirror 684. The alignment can be accomplished by supporting a second end portion 686 within a second capillary tube and securing the second mirror 684 to the second capillary tube 688. Alternatively, in preferred embodiments, the second mirror 684 is formed by deposition of reflective coatings directly onto the second end 682.

In the embodiment of FIG. 9, the first mirror 674 and the second mirror 684 are preferably substantially 100% reflective in the wavelength range of 1055 to 1075 nanometers so that substantially all of the light emerging from either the first end 672 or the second end 682 is reflected back into the respective end. Preferably, the second mirror 684 is substantially 100% non-reflective (i.e., transmissive) at the pump wavelength of approximately 822 nanometers. Also preferably, the multiplexing coupler 620 is constructed so that approximately 100% of the optical energy at the pump wavelength of 822 nanometers is coupled from the coupler portion 648 of the non-lasing optical fiber 614 to the coupler portion 660 of the lasing optical fiber 610. The multiplexing coupler 620 is also constructed so that approximately 5-10%, for example, of optical energy having wavelengths in the range of 1055 to 1075 nanometers is coupled from the coupler portion 660 of the lasing optical fiber 610 to the coupler portion 648 of the non-lasing optical fiber 614.

In operation, the input pump signal 634 propagates from the input end 634 of the non-lasing optical fiber 614 to the port A of the multiplexing coupler 620 wherein approximately 100% of the optical energy is coupled to the port D of the multiplexing coupler 620. The coupled pump light propagates through the long second lasing segment 680 to the second end 682 where it preferably exits through the second mirror 684. The pump signal pumps the lasing medium in the lasing optical fiber 610 and causes the emission of optical energy at the lasing wavelengths of 1055 to 1075 nanometers. Approximately 90–95% of the laser optical energy remains in the lasing optical fiber 610 because of the multiplexing action of the multiplexing coupler 620 and because of the reflections of the first mirror 674 and the second mirror 684. The 5–10% of the laser optical energy that is coupled from the port C of the multiplexing coupler 620 to the port B of the multiplexing coupler 620 is output via the second end 654 of the non-lasing optical fiber 614 as a laser output signal 690. The portion of the laser optical signal coupled from the port D of the multiplexing coupler 620 to the port A of the multiplexing coupler 620 is lost through the first end 630 of the non-lasing optical fiber 614.

In the embodiment of FIG. 9, it is only necessary that a portion of the second lasing segment 680 be lasing. The shorter optical fiber segment 670 can be constructed from non-lasing optical fiber. Thus, in an alternative embodiment (not shown), the multiplexing coupler 620 is constructed entirely from non-lasing fiber in a conventional manner and the second lasing segment 680 is spliced to the non-lasing fiber extending from the port D of the multiplexing coupler 620. The first optical fiber segment 670 can be spliced onto the non-lasing fiber extending from the port C of the multiplexing coupler 620, or, as a further alternative, the first mirror 674 can be fabricated onto or mounted proximate to the non-lasing fiber.

FIG. 10 illustrates a further alternative embodiment of an optical laser fiber 900 that incorporates a single optical lasing fiber 910, such as has been described above. The embodiment of FIG. 10 further includes a first multiplexing coupler 914 and a second multiplexing coupler 918 which are preferably constructed in accordance with the above-referenced U.S. Pat. No. 4,556,279. The coupling percentages of the two couplers are preferably adjusted so that the two couplers couple approximately zero percent of light having wavelengths in the range of 800 to 840 nanometers. The first multiplexing coupler 914 is constructed to couple approximately 50% of light having wavelengths in the range of 1050 to 1080 nanometers. The second multiplexing coupler is constructed to couple less than 50% (e.g., 45–48%) of light having wavelengths in the range of 1050 to 1080 nanometers.

The lasing optical fiber 910 has an input end 920. An input end portion 924 of the lasing optical fiber 910 interconnects the input end 920 with a port A of the first multiplexing coupler 914. A first coupler portion 930 of the first multiplexing coupler 914 interconnects the port A with a port B of the first multiplexing coupler 914. The first coupler portion 930 of the first multiplexing coupler 914 is juxtaposed with a second coupler portion 934 which interconnects a port C with a port D. A first loop portion 940 of the lasing optical fiber 910 interconnects the port B of the first multiplexing coupler 914 with the port D of the first multiplexing coupler 914 so that light emitted from the port B propagates around the first loop portion 940 and enters the port D.

The port C of the first multiplexing coupler 914 is connected via an intermediate portion 950 of the lasing optical fiber 910 to a port A of the second multiplexing coupler 918. The port A of the second multiplexing coupler 918 is connected to a port B of the second multiplexing coupler 918 by a first coupler portion 954 which is juxtaposed with a second coupler portion 958. The second coupler portion 958 interconnects a port C and a port D of the second multiplexing coupler 918. The port B and the port D of the second multiplexing coupler 918 are interconnected by a second loop portion 960 of the lasing optical fiber 910. An output end portion 964 interconnects the port C of the second multiplexing coupler 918 with an output end 968.

The optical fiber laser 900 of FIG. 10 further includes an optical pump source 970 which provides a pump signal 974 having a wavelength in the broadband pumping range for the lasing optical fiber 910. For the lasing optical fiber described above, the pump wavelength is preferably approximately 822 nanometers. The pump signal 974 is coupled to the input end 920 by a focusing lens 978 or other suitable means. For example, the input end 920 can be butt-coupled or spliced to the output of a suitable pump source. The pump signal propagates to the port A of the first multiplexing coupler 914 via the input end portion 924. Since substantially zero percent of the pump signal is coupled, substantially all of the pump signal emerges from the port B of the first multiplexing coupler 914 and propagates around the first loop portion 940 and enters the port D of the first multiplexing coupler 914. Again, substantially no coupling occurs, and the pump signal emerges from the port C of the first multiplexing coupler 914 propagates through the intermediate fiber portion 950 to the port A of the second multiplexing coupler 918. The pump signal emerges from the port B of the second multiplexing coupler 918 and propagates around the second loop portion 960 to the port D of the second multiplexing coupler 918. The pump signal exits from the port C of the second multiplexing coupler 918 and propagates through the output end portion 964 to the output end 968 of the lasing optical fiber 910. As the pump signal propagates through the optical fiber portions described above, it is absorbed by the lasing material and the intensity of the optical pump energy that emerges from the output end 968 is substantially smaller than the intensity of the pump signal input to the input end 920. It can be seen that the pump optical energy propagates one time only through the propagation paths provided by the fiber portions.

As discussed above, the absorbed pump signal causes the emission of optical energy at the laser wavelengths (e.g., in the range of 1055 to 1075 nanometers for the lasing material described herein). The lasing optical energy thus generated propagates in the above-described fiber portions. Unlike the pump optical energy which propagates only once through the propagation paths, the laser optical energy is recirculated in the intermediate fiber portion 950 by the operation of the first and second multiplexing couplers 914 and 918. The total length of the cavity is defined by the intermediate portion 950 and one of the first and second loop portions 940 and 960.

One skilled in the art will understand that the first multiplexing coupler 914 and the second multiplexing coupler 918 operate as mirrors with respect to the light propagating in the intermediate fiber portion 950. For example, light entering the port C of the first multiplexing coupler 914 from the intermediate fiber portion 950 will be coupled to the port D for counterclockwise propagation in the first loop portion 940 and to the port B for clockwise propagation around the first loop portion 940. The two counterpropagating light signals will return to the port B and the port D, respectively, where they are combined. Because of the known phase relationships between the optical signals, substantially all of the light will be coupled to the port C and will again propagate through the intermediate fiber portion 970. Thus, the first multiplexing coupler 914 acts as a substantially 100% reflective mirror corresponding to the first mirror 340 in FIG. 2. Since the second multiplexing coupler 918 is constructed to have less than 50% coupling, less than 100% of the light coupled from the port A of the second multiplexing coupler 918 into the second loop portion 960 will be coupled back to the port A and thus back to the intermediate fiber portion 950. A small portion of the light will be coupled to the port C of the second multiplexing coupler 918 and will propagate through the output end portion 964 to the output end 968 and is provided as a laser output signal 980. The laser output signal 980 is advantageously provided as a broadband laser input signal to a rotation sensor, or the like, such as the rotation sensor 100 of FIG. 1. The output end 968 can be butt-coupled or spliced to the input of the rotation sensor. As in previous embodiments, the length of the resonant cavity for this embodiment is equal to the round trip distance travelled by the laser light, namely, the combined length of the loops 940, 960, plus twice the length of the intermediate portion 950.

Additional details regarding similar laser configurations using couplers as reflectors can be found, for example, in Iain D. Miller, et al., "A Nd$^{3+}$-doped cw fiber laser using all-fiber reflectors," *APPLIED OPTICS*, Vol. 28, No. 11, 1 June 1987, pp. 2197-2201.

Description of an Alternate Embodiment Having a Phase Modulator in the Resonant Cavity of the Laser The above-described resonant cavity broadband fiber laser has been shown to be very useful as a broadband light source for an optical fiber rotation sensor such as was illustrated above in connection with FIG. 1. As discussed above, the resonant cavity fiber laser of the present invention has been found to provide emission linewidths in the range of 20 nanometers and to have a temperature coefficient of approximately 6 parts per million per degree centigrade (6 ppm/°C.) for the average wavelength of the emitted light. It is expected that simple temperature control of optical fiber system will yield a temperature coefficient of approximately 1 ppm/°C. As further discussed above, the slope of the curve of fiber laser average wavelength versus the pump diode average wavelength has a relatively stationary point (M in FIG. 5) wherein the slope of the curve is zero. By operating around this stationary point, relatively straightforward temperature control of the pump diode source of the resonant laser can be used to provide a stable laser output signal.

It has been found in some experiments with the above-described resonant cavity optical fiber lasers that the laser is sensitive to modulated optical feedback from the rotation sensor 100 (FIG. 1). The modulated optical feedback causes the laser optical signal generated by the resonant cavity laser to vary and thus causes an error in the rotation rate indicated by the rotation sensor 100.

Figure 11:
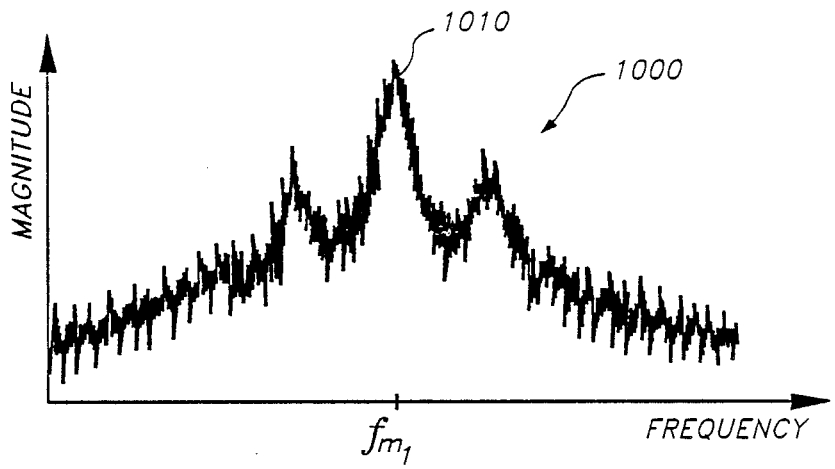
FIG. 11 is a spectral scan of an electrical output signal from an experimental rotation sensor in accordance with FIG. 1 when the rotation sensor is stationary, the spectral scan illustrating the effect of a modulated optical feedback signal from the rotation sensor of FIG. 1 to the resonant cavity laser of FIG. 2 when the resonant cavity laser is used as the broadband signal source for the rotation sensor.
Figure 12:
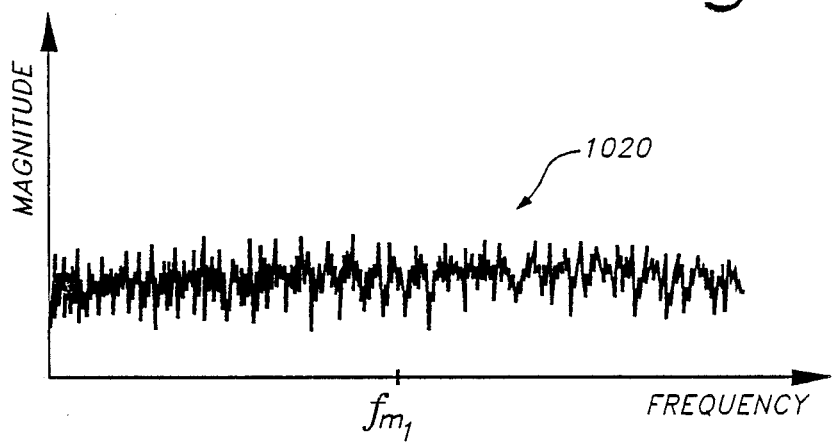
FIG. 12 is a spectral scan of the electrical output signal from the rotation sensor of FIG. 1 when the rotation sensor is stationary and when the optical output from the signal source is blocked, the spectral scan illustrating the electronic noise generated by the electronic drive and detection circuit in the absence of detected optical energy.

The effect of the modulated feedback signal in one exemplary experiment is illustrated in FIGS. 11 and 12. FIG. 11 illustrates an exemplary spectral scan 1000 of the electrical output signal generated by the rotation sensor 100 on the ROTATION RATE signal line 230 in FIG. 1 when using the resonant cavity laser 300 of FIG. 2. In FIG. 11, the rotation sensor 100 is stationary (i.e., not rotating). As illustrated, the spectral scan 1000 has a significant peak 1010 at a frequency of $f_{m1}$, where $f_{m1}$ is the frequency of the signal applied to the phase modulator 218 by the drive and detection electronics circuit 210. By blocking the optical signal applied to the input of the rotation sensor 100 from the light source 110 (i.e., from the resonant cavity laser 300 of FIG. 2), it has been found that there is electronic noise generated by the rotation sensor that is not caused by the optical modulation. The electronic noise is illustrated by a spectral scan 1020 in FIG. 12. The peak 1010 in the spectral scan 1000, representing the feedback error appearing in the ROTATION RATE signal, is on the order of 40 dB greater than the electronic noise floor.

Figure 13:
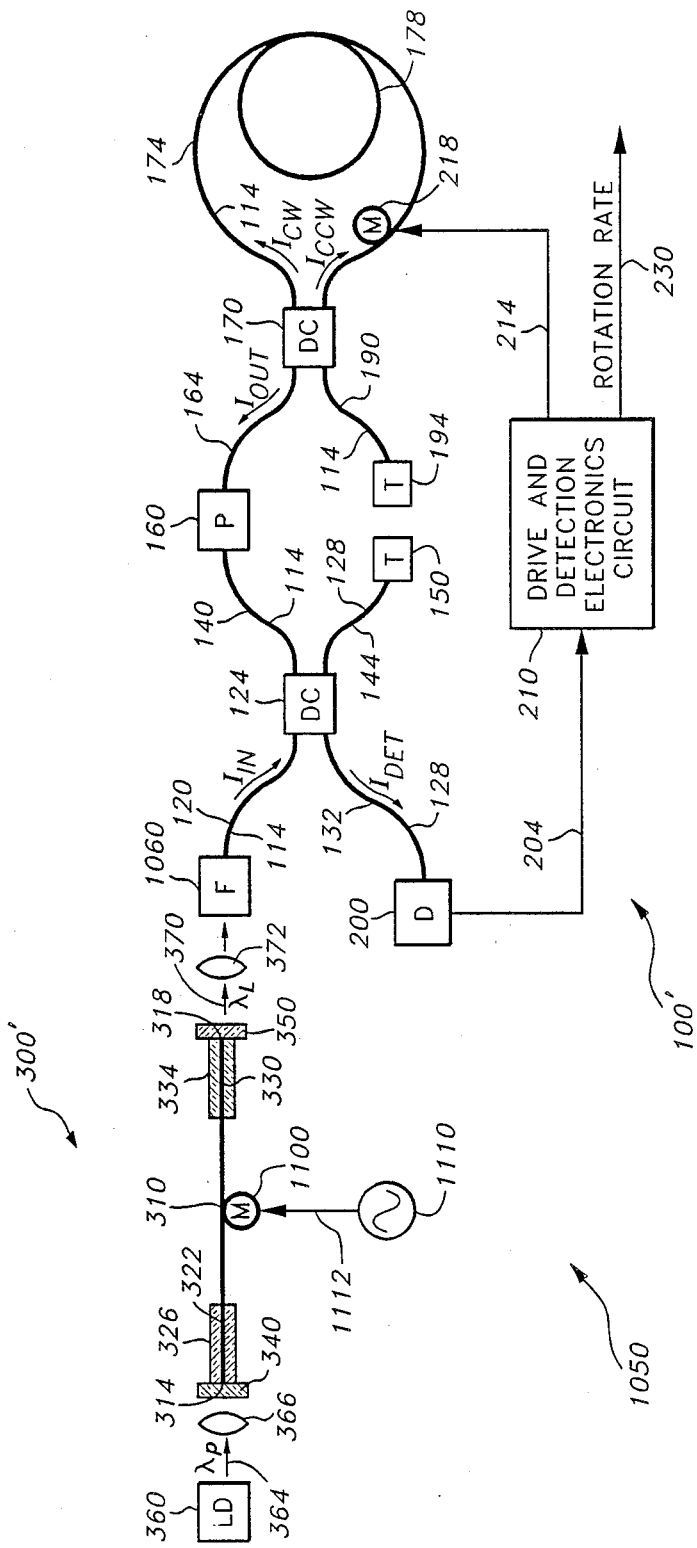
FIG. 13 illustrates the rotation sensor of FIG. 1 modified to include a Faraday isolator and illustrates the resonant cavity fiber laser of FIG. 2 modified to include a phase modulator within the cavity, the resonant cavity fiber laser supplying the broadband optical input signal to the rotation sensor.

FIG. 13 illustrates an exemplary embodiment of a rotation sensor system 1050 that combines a rotation sensor 100', constructed in accordance with the rotation sensor 100 of FIG. 1, with a resonant cavity laser 300', constructed in accordance with the resonant cavity laser 300 of FIG. 2. In FIG. 13, like elements of the rotation sensor 100' are labelled with the same identification numbers used in the rotation sensor 100 of FIG. 1. Similarly, the like elements of the resonant cavity laser 300' have the same numeric identifiers as in the rotation sensor 300 of FIG. 2. The operation of the rotation sensor 100' and the resonant cavity laser 300' can be understood by referring to the descriptions of FIGS. 1 and 2, respectively. As will be discussed below, the rotation sensor system 1050 includes modifications to the rotation sensor 100' and to the resonant cavity laser 300' to suppress the error caused by modulated feedback from the rotation sensor 100'.

In FIG. 13, the rotation sensor 100, includes a Faraday isolator 1060 which is positioned between the resonant cavity laser 300' and the input segment 120 of the optical fiber 114. Faraday isolators are well-known to the art and are readily available as bulk optic components. In addition, Faraday isolators can be constructed as optical fiber components and used in combination with rotation sensors, as described in U.S. Pat. No. 4,615,582 and U.S. Pat. No. 4,671,658, both of which are incorporated herein by reference. Thus, the Faraday isolator can be formed on the input segment 120 of the optical fiber 114.

Basically, the Faraday isolator 1060 operates to allow light to pass through the input segment 120 of the optical fiber 114 from the resonant cavity laser 300' toward the directional coupler 124 but attenuates and substantially blocks the light travelling in the opposite direction from the directional coupler 124 toward the resonant cavity laser 300'. For example, in one particular embodiment of this aspect of the invention, the Faraday isolator 1060 has an optical isolation ratio of approximately 30 dB to provide a reduction in the first harmonic electronic error signal of approximately 30 dB.

As further illustrated in FIG. 13, the resonant cavity laser 300' includes a phase modulator (M) 1100 that is inserted within the laser cavity to reduce the response of the modulated feedback. In one particular embodiment of this aspect of the invention, the phase modulator 1100 comprises a PZT ring having a diameter of approximately 7.5 centimeters. The optical fiber 310 is wrapped around the PZT ring so that expansion and contraction of the PZT ring causes stretching and relaxation of the optical fiber 310 in a manner well known to the art.

Figure 14:
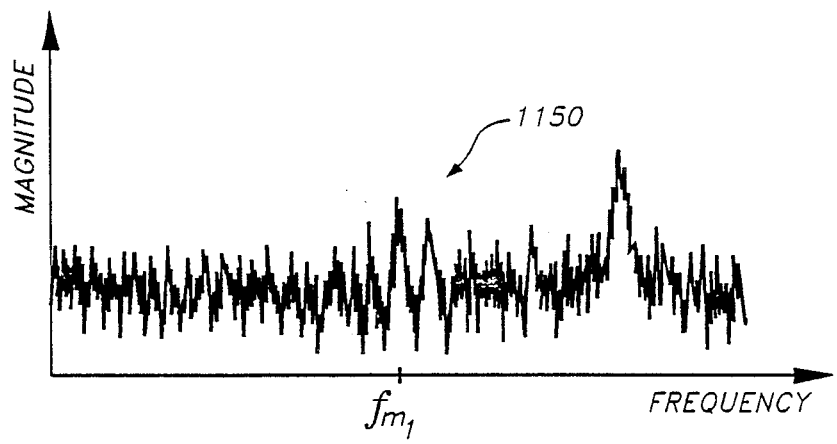
FIG. 14 is a spectral scan of the electrical output signal from the rotation sensor of FIG. 13 showing the reduced electrical noise level caused by the suppression of the modulated optical feedback signal by the operation of the phase modulator within the resonant cavity of the laser.

The phase modulator 1100 is electrically driven by a signal generator 1110 via a set of signal lines represented as a single signal line 1112. The signal generator 1110 generates an electrical signal having a frequency and a magnitude which can be varied while monitoring the output of the rotation sensor 100'. The frequency and the magnitude of the electrical signal generated by the signal generator 1110 are varied while the rotation sensor 100' is maintained in a stationary position until the minimum error indication is exhibited by the output of the rotation sensor. In other words, a frequency and a magnitude are selected wherein the output of the rotation sensor 100 indicates a substantially zero rotation rate when it is stationary. It has been found that the error signal caused by optical modulation feedback is a function of the frequency and the magnitude of the drive signal applied to the phase modulator 218 of the rotation sensor 100', although this function has not yet been mapped or defined. In one particular embodiment of the invention wherein the drive signal applied to the phase modulator 218 has a frequency of approximately 97.3 kHz, a frequency of 13.1 kHz for the drive signal applied to the phase modulator 1100 from the signal generator 1110 was found to reduce the error to a level substantially equal to the electronic noise level of the system, as illustrated by a spectral scan 1150 in FIG. 14.

Figure 15:
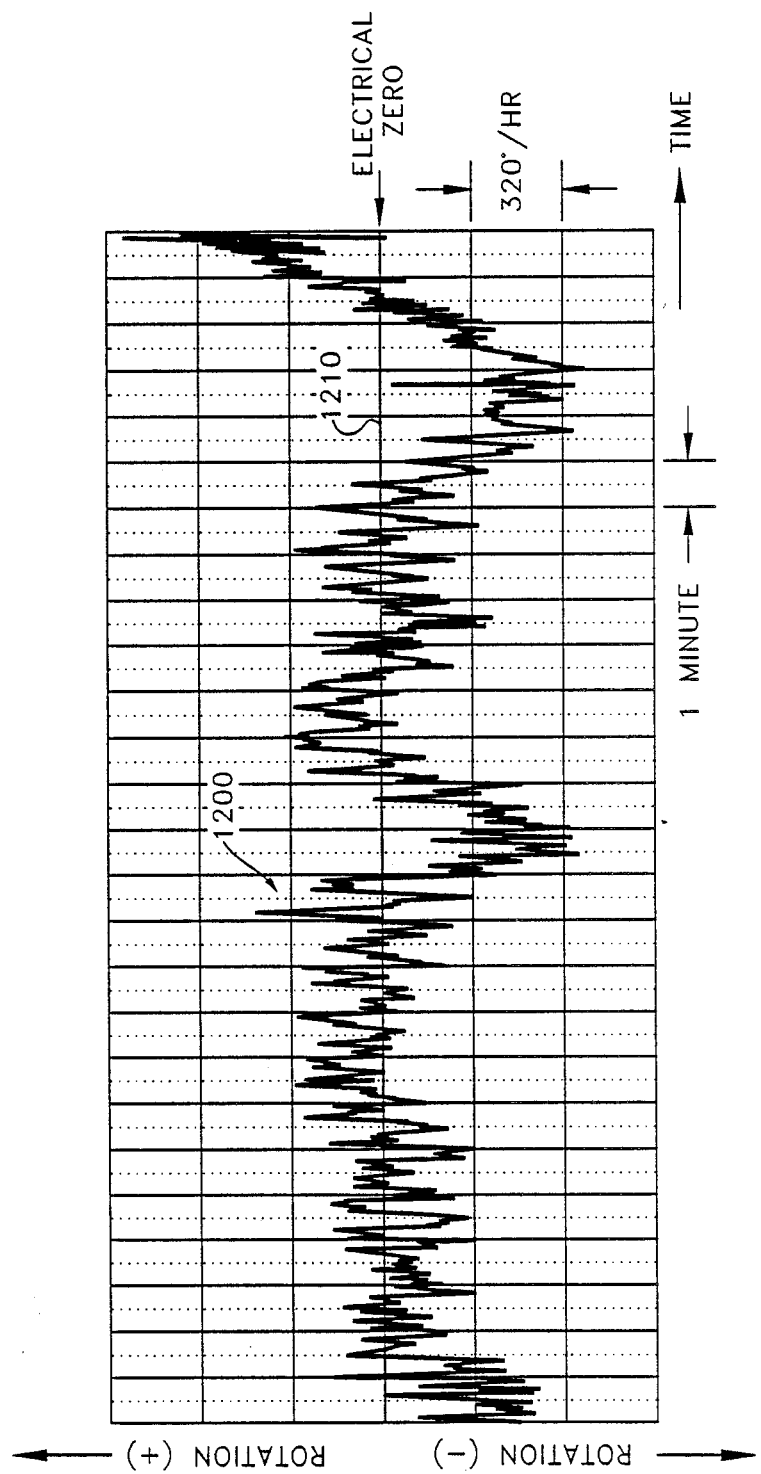
FIG. 15 is a strip chart recording of the electrical output of the rotation sensor of FIG. 13 with no drive signal applied to the phase modulator in the resonant cavity of the resonant cavity laser and without the Faraday isolator, showing the random noise and drift of the electrical output signal while the rotation sensor is stationary.
Figure 16:
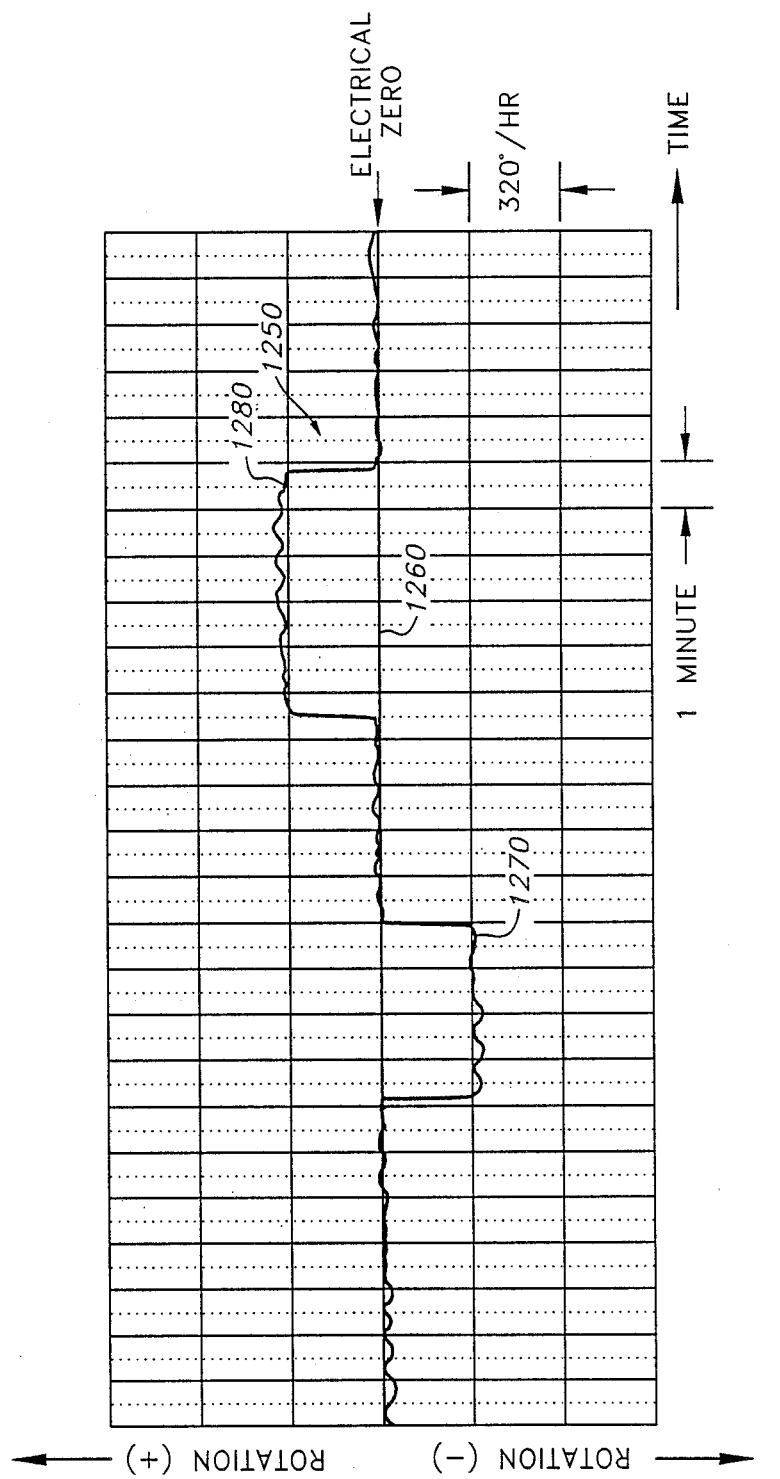
FIG. 16 is a strip chart recording of the electrical output signal from the rotation sensor of FIG. 13 with the drive signal applied to the phase modulator within the resonant cavity and without the Faraday isolator, showing the effect of the phase modulator in reducing the noise in the electrical output signal caused by modulated optical feedback.

The effect of the use of the phase modulator 1100 is illustrated in FIGS. 15 and 16. (FIGS. 15 and 16 were produced in an experiment when the Faraday isolator 1060 was not included in the embodiment of FIG. 13.) FIG. 15 represents an exemplary strip chart recording 1200 taken at the output of the drive and detection electronics circuit 210 over a 25-minute interval with the rotation sensor 100' at rest with no signal applied to the phase modulator 1100 in the resonant cavity laser 300'. A line 1210 represents the electrical zero of the output signal. As illustrated, the strip chart recording 1200 exhibits substantial random noise and drift of the output signal which reaches levels representing rotation rates of 500 degrees per hour.

In contrast to FIG. 15, FIG. 16 represents an exemplary strip chart recording 1250 taken over a similar time interval with the drive signal applied to the phase modulator 1100 in the resonant cavity laser 300'. An electrical zero line 1260 is shown for reference. As illustrated, the random noise and drift is substantially reduced. The strip chart recording 1250 includes a first portion 1270 and a second portion 1280 representing time intervals wherein the rotation sensor 100' is caused to rotate at a constant rate of −320 degrees per hour and a constant rate of +320 degrees per hour, respectively, to calibrate the vertical scale of the strip charts. As illustrated, the two portions 1270, 1280 representing rotation are well delineated on the strip chart recording 1250.

It can be seen that the phase modulator 1100 in the resonant cavity of the laser 300' provides a significant improvement in the operation of the resonant cavity laser. It should be understood that a phase modulator, such as the phase modulator 1100 can be incorporated into the resonant cavity optical fiber lasers 500, 600, 900 of the embodiments of FIGS. 8, 9 and 10.

Various embodiments of a broadband optical fiber laser source have been described above. Although the invention has been described with reference to these specific embodiments, the descriptions have been illustrative of the invention and are not intended to be limiting. Various modifications and applications may occur to those skilled in the art without departing from the true spirit and scope of the invention as defined in the appended claims.

What is claimed is:

1. A resonant laser, comprising:
    a resonant cavity having a lasing medium which emits light in an emission spectrum in response to application of pump energy to said lasing medium, said emission spectrum having a first bandwidth at a first wavelength of said pump energy and a second bandwidth at a second wavelength of said pump energy, said second bandwidth at least 50 percent greater than said first bandwidth, said resonant cavity being sized to support at least thousands of longitudinal modes, at least some of said modes corresponding to wavelengths outside said first bandwidth, but within said second bandwidth; and
    a source of pump energy having said second wavelength.

2. The resonant laser as defined in claim 1, wherein said second wavelength is greater than said first wavelength.

3. The resonant laser as defined in claim 1, wherein said second wavelength is less than said first wavelength.

4. The resonant laser as defined in claim 1, wherein said source of pump energy comprises a laser diode.

5. The resonant laser as defined in claim 1, wherein said lasing medium comprises a single-mode optical fiber.

6. The resonant laser as defined in claim 1, wherein said lasing medium has an absorption band having peak absorption wavelengths and said source of pump energy has a wavelength other than said peak absorption wavelengths.

7. The resonant laser as defined in claim 1, wherein said resonant cavity is formed by an optical fiber having first and second ends and having respective first and second mirrors positioned proximate to said first and ends to reflect light therebetween, at least one of said mirrors being partially transmissive to emitted light having a wavelength within said second bandwidth so that a portion of said emitted light passes through said mirror.

8. The resonant laser as defined in claim 1, wherein said resonant cavity comprises a loop of lasing optical fiber, said laser additionally comprising a multiplexing coupler for coupling light to and from said loop, said multiplexing coupler transferring said pump energy to and from said loop such that said pump energy propagates once around said loop, said multiplexing coupler outputting only a small fraction of said emitted light from said loop so that a substantial portion of said emitted light circulates around said loop.

9. The resonant laser as defined in claim 1, wherein said resonant cavity comprises:
    a lasing optical fiber having first and second ends;
    a second optical fiber coupled to said source of pump energy;
    a multiplexing coupler which couples said second fiber and said lasing optical fiber at a location between said first and second ends, said multiplexing coupler coupling pump energy from said second optical fiber to said lasing optical fiber and coupling said emitted light from said lasing optical fiber to said second optical fiber; and first and second mirrors positioned proximate to said first and second ends, respectively, of said lasing optical fiber, said first and second mirrors reflecting substantially all light incident thereon at said wavelength within said second bandwidth.

10. The resonant laser as defined in claim 1, wherein said resonant cavity comprises:
a lasing optical fiber forming first and second loop portions with an intermediate portion therebetween;
first and second wavelength selective multiplexing couplers which optically couple said intermediate portion to said first and second loop portions, respectively, said source of pump energy being coupled to input pump energy to one of said multiplexing couplers for propagation through said lasing optical fiber; and
the wavelength selective characteristics of said multiplexing couplers being selected such that (i) said pump energy propagates through said lasing optical fiber with substantially zero coupling of light at said multiplexing couplers, and (ii) a substantial portion of said emitted light passes a plurality of times through said intermediate portion of said lasing optical fiber.

11. An optical sensor, comprising:
a loop comprising an optical fiber having two polarization modes, each of said polarization modes propagating light at a different velocity, thereby providing an effective optical path length difference for said two modes for light traversing said loop; and
a laser comprising a lasing medium formed of an optical fiber, said laser having a resonant cavity, said laser coupled to supply light to said loop, said optical path length difference being less than the product of the length of the resonant cavity of said laser and the refractive index of the optical path travelled by the light through the resonant cavity, said laser being sized to support at least thousands of longitudinal modes.

12. The optical sensor as defined in claim 11, wherein said laser comprises an optical fiber formed of laser material.

13. The optical sensor as defined in claim 12, wherein said optical fiber formed of laser material comprises a single-mode optical fiber.

14. The optical sensor as defined in claim 11, further including a phase modulator positioned in said resonant cavity to modulate optical energy in said resonant cavity, said phase modulator operating to reduce errors caused by light entering said laser after traversing said loop.

15. A resonant laser, comprising:
an optical fiber formed of laser material, said laser material having a wavelength absorption band and emitting light in response to optical pumping with pump light, the wavelength of said emitted light varying with the wavelength of said pump light through said absorption band in accordance with a characteristic curve having at least one minima or maxima; and a source of pump light which produces light at a wavelength corresponding to one of said minima or maxima.

16. The resonant laser as defined in claim 15, wherein said one of said minima or maxima corresponds to a wavelength of said pump light that produces broadband emission of said emitted light.

17. A resonant laser comprising:
an optical fiber comprising a combination of an optical propagation medium and a lasing medium, said lasing medium having an absorption bandwidth such that said lasing medium absorbs optical energy having a wavelength within said absorption bandwidth and emits light having a wavelength outside said absorption bandwidth, said absorption bandwidth comprising at least first and second wavelength ranges, said lasing medium responsive to light having wavelengths within said first wavelength range to emit light having a first narrow optical bandwidth, said lasing medium responsive to light having wavelengths within said second wavelength range to emit light having a second broad optical bandwidth greater than said first bandwidth;
a source of optical energy that generates an optical input signal having a wavelength within said second wavelength range;
means for coupling said optical input signal to said optical fiber so that said optical input signal propagates in said optical fiber, said lasing material responsive to said optical input signal to generate optical laser energy in said optical fiber, said optical laser energy comprising a plurality of wavelengths having an overall bandwidth greater than said first bandwidth; and
means for repeatedly passing a substantial portion of said optical laser energy through said optical fiber so that said recirculating portion of said laser optical energy stimulates emission of additional laser optical energy having said plurality of wavelengths.

18. The resonant laser as defined in claim 17, wherein said second bandwidth is at least 50 percent greater than said first bandwidth.

19. The resonant laser as defined in claim 17, wherein said plurality of wavelengths has an overall bandwidth at least 50 percent greater than said first bandwidth.

20. The resonant laser as defined in claim 17, wherein said means for coupling comprises a lens interposed between said source of optical energy and said optical fiber.

21. A resonant fiber laser, comprising:
a lasing medium comprised of optical fiber and forming a resonant cavity, said lasing medium emitting light in plural longitudinal modes corresponding to discrete wavelengths, each having a bandwidth, said plural longitudinal modes forming a spectral emission envelope having a bandwidth orders of magnitude larger than the bandwidth of any of the discrete wavelengths, said plural modes providing a coherence function for said laser having first and second coherence peaks spaced apart by a coherence peak spacing, said coherence peaks having a width at least three orders of magnitude less than said coherence peak spacing; and
a source of pump energy for pumping said lasing medium.

22. A resonant laser as defined by claim 21, wherein said emission envelope has an average wavelength which varies as a function of the wavelength of said pump energy in accordance with a characteristic curve having a region at which said average wavelength is relatively insensitive to changes in the pump energy wavelength, said pump energy wavelength being selected to correspond to said region to stabilize said average wavelength.

23. A fiber optic sensor for sensing an ambient effect, comprising:
a loop comprising an optical fiber which propagates light in two polarization modes, said polarization modes propagating light at different velocities and providing two optical paths through said fiber, said two optical paths having an optical path difference therebetween for light traversing said loop in the absence of said ambient effect;
a laser coupled to introduce light into said loop, said laser comprising:
a resonant cavity having a lasing medium which emits light having a bandwidth and an average wavelength in response to a pump wavelength, said average wavelength and said bandwidth dependent on said pump wavelength, said bandwidth being relatively narrow in a first range of average wavelengths and relatively broad in a second range of average wavelengths;
a source of pump energy having a pump wavelength selected to cause said lasing medium to emit light at an average wavelength within said second range of average wavelengths; and
said resonant cavity having a length greater than said optical path difference divided by the refractive index of the optical path travelled by the light through said resonant cavity.

24. A fiber optic sensor as defined in claim 23, wherein said ambient effect is rotation.

25. A fiber optic sensor as defined in claim 23, wherein said lasing medium comprises a single-mode optical fiber.

26. A fiber optic sensor as defined in claim 23, wherein said loop comprises a single-mode birefringent optical fiber.

27. A fiber optic sensor as defined in claim 23, wherein the light emitted by said laser has a coherence length which is less than said optical path length difference.

28. A fiber optic sensor as defined in claim 23, wherein said resonant cavity is sized to support at least ten thousand longitudinal modes.

29. A fiber optic sensor as defined in claim 23, wherein said average wavelength varies as a function of said pump wavelength, said lasing medium having a selected average wavelength within said second range of wavelengths that is substantially insensitive to variations in pump wavelength, said pump wavelength being selected to produce said selected average wavelength.

30. A fiber optic sensor as defined in claim 23, further including a phase modulator positioned in said resonant cavity to modulate the optical energy in said resonant cavity, said phase modulator operating to reduce errors caused by light entering said laser after traversing said loop.

31. A method of supplying broadband light to an interferometer, comprising:
pumping a lasing medium at a pump wavelength to cause said lasing medium to emit light;
selecting the pump wavelength to provide an inhomogeneously broadened emission having a selected bandwidth;
repeatedly passing a portion of the emission through said lasing medium to stimulate emission of light at discrete wavelengths which form a spectral envelope;
filling said spectral envelope with a sufficient number of said discrete wavelengths to provide an effectively continuous spectrum within said spectral envelope; and
coupling said emission to an interferometer.

32. The method as defined in claim 31, wherein said step of repeatedly passing comprises the step of reflecting light between two mirrors.

33. The method as defined in claim 31, wherein said step of repeatedly passing comprises the step of circulating light in a loop of optical fiber.

34. The method as defined in claim 31, wherein said step of filling the spectral envelope comprises the step of generating at least ten thousand longitudinal modes in said lasing medium.

35. The method as defined in claim 31, wherein said interferometer comprises a Sagnac interferometer.

36. An apparatus, comprising:
an interferometer; and
a broadband light source, comprising:
a lasing medium;
a pump light source that pumps said lasing medium to cause said lasing medium to emit light, said pump light source having a pump wavelength selected to cause said lasing medium to provide an inhomogeneously broadened emission having a selected bandwidth, said broadband light source further including a resonant cavity that repeatedly passes a portion of the emission through said lasing medium to stimulate the emission of light at discrete wavelengths which form a spectral envelope, said discrete wavelengths being sufficient in number to fill said spectral envelope so as to provide an effectively continuous spectrum within said spectral envelope.

37. The apparatus as defined in claim 36, wherein said interferometer comprises a sagnac interferometer.

38. The apparatus as defined in claim 36, wherein said resonant cavity comprises a pair of reflecting members.

39. The apparatus as defined in claim 36, wherein said resonant cavity is sized to support at least ten thousand longitudinal modes.

40. The apparatus as defined in claim 36, further including a phase modulator positioned in said resonant cavity to modulate light in said resonant cavity, said phase modulator operating to reduce errors caused by light entering said resonant cavity from said interferometer.

41. A broadband laser, comprising:
an optical fiber resonant cavity having a lasing medium which emits light in an emission spectrum in response to application of pump energy to said lasing medium, said lasing medium having at least first and second light absorption wavelength ranges, said lasing medium responsive to light having a wavelength within said first range to emit light having a first emission bandwidth, and responsive to light having a wavelength within said second wavelength range to emit light having a second emission bandwidth, said second emission bandwidth being broad compared to said first emission bandwidth to provide broadband emission for said laser, said resonant cavity being sized to support at least thousands of longitudinal modes, at least some of said modes corresponding to wavelengths outside said first emission bandwidth, but within said second emission bandwidth; and a source of optical energy that generates an optical signal having a wavelength within said, second wavelength range for pumping said lasing medium.

42. The broadband laser as defined in claim 41, wherein said optical fiber is a single mode optical fiber.

43. The broadband laser as defined in claim 41, wherein said optical fiber is comprised substantially entirely of said lasing medium.

44. The broadband laser as defined in claim 41, wherein said lasing medium has peak absorption wavelengths and said source of said optical energy has a wavelength other than said peak absorption wavelengths.

45. The broadband laser as defined in claim 41, wherein said resonant cavity comprises a loop comprising said optical fiber, said laser additionally comprising a multiplexing coupler for coupling light to and from said loop.

46. A sensor, comprising:

an optical loop;

a laser for introducing light into said optical loop, said laser comprising an optical fiber having a lasing medium, said optical fiber forming a resonant cavity sized to support broadband emission, and a source of pump energy having a pump wavelength selected to cause said lasing medium to emit light in a broadband spectrum; and means for suppressing variations in the emission of light by said laser caused by feedback of light from said optical loop to said resonant cavity.

47. A sensor as defined in claim 46, wherein said suppressing means comprises an optical isolator.

48. A sensor as defined in claim 46, wherein said suppressing means comprises a modulator coupled to modulate the optical path length of said laser cavity.

* * * * *

UNITED STATES PATENT AND TRADEMARK OFFICE
CERTIFICATE OF CORRECTION

PATENT NO. : 4,964,131
DATED : October 16, 1990
INVENTOR(S) : Karen Liu, Byoung Y. Kim, et al It is certified that error appears in the above-identified patent and that said Letters Patent is hereby corrected as shown below:

At Column 5, line 24, change "$\alpha\lambda_L$" to --$\Delta\lambda_L$--.

At Column 5, line 26, change "$\lambda_L^{AVG}$" to --$\lambda_{L_{AVG}}$--.

At Column 14, lines 10, 31, 37, 42, 48 and 51, change "$\lambda_L^{AVG}$" to --$\lambda_{L_{AVG}}$--.

At Column 14, line 14, change "$\lambda_{LAVG}$" to --$\lambda_{L_{AVG}}$--.

At Column 14, lines 21, 24, 27, 49 and 51, change "$\alpha\lambda_L$" to --$\Delta\lambda_L$--.

At Column 14, line 42 change "$A\lambda_L$" to --$\Delta\lambda_L$--.

At Column 15, line 68 change "$(\alpha\lambda_L)$" to --$(\Delta\lambda_L)$--.

At Column 16, lines 28, 31, 34 and 44, change "$\alpha_L^S$" to --$\Delta_{L_S}$--.

At Column 17, lines 30 and 47, change "$\alpha_L^S$" to --$\Delta_{L_S}$--.

Signed and Sealed this

First Day of June, 1993

*Attest:*

MICHAEL K. KIRK

*Attesting Officer*  Acting Commissioner of Patents and Trademarks